(12) United States Patent
Moran

(10) Patent No.: US 6,522,817 B2
(45) Date of Patent: Feb. 18, 2003

(54) OPTICAL FIBER ARRAY AND METHOD OF FORMATION

(75) Inventor: Joseph M. Moran, Berkeley Heights, NJ (US)

(73) Assignee: Veritech, Inc., Whippany, NJ (US)

( * ) Notice: Subject to any disclaimer, the term of this patent is extended or adjusted under 35 U.S.C. 154(b) by 79 days.

(21) Appl. No.: 09/739,045

(22) Filed: Dec. 18, 2000

(65) Prior Publication Data

US 2002/0154882 A1 Oct. 24, 2002

(51) Int. Cl.$^7$ ................................................ G02B 6/04
(52) U.S. Cl. ......................................... 385/120; 29/850
(58) Field of Search ........................... 385/120, 80, 88, 385/123, 116, 115, 136, 137, 493; 29/850, 837, 846, 852, 830, 872, 882, 883, 857, 843, 863, 865, 866

(56) References Cited

U.S. PATENT DOCUMENTS

| | | | | |
|---|---|---|---|---|
| 4,812,002 A | * | 3/1989 | Kato et al. ............... | 350/96.18 |
| 5,017,145 A | * | 5/1991 | Kanai et al. .................. | 439/45 |
| 5,247,597 A | * | 9/1993 | Blacha et al. ................ | 385/88 |
| 5,321,785 A | * | 6/1994 | Iida et al. ................... | 385/115 |
| 5,377,286 A | * | 12/1994 | Iida et al. .................... | 385/33 |
| 5,394,498 A | * | 2/1995 | Hinterlonng et al. ....... | 385/127 |
| 5,584,956 A | * | 12/1996 | Lumpp et al. ................ | 29/846 |
| 5,704,115 A | * | 1/1998 | Warburton ................... | 29/830 |
| 5,901,262 A | * | 5/1999 | Kobayashi et al. .......... | 385/89 |
| 5,907,650 A | * | 5/1999 | Sherman et al. ............. | 385/89 |
| 6,385,845 B2 | * | 5/2002 | Mori .......................... | 29/587 |

* cited by examiner

Primary Examiner—Lynn D. Feild
Assistant Examiner—J. F. Duverne
(74) Attorney, Agent, or Firm—Irwin Ostroff; Erwin Pfeifle

(57) ABSTRACT

Preselected alignment of an array of N optical fibers is obtained using a relatively thick primary substrate with a thin layer mounted thereon. The primary substrate has a sufficient structure to support an array of N spaced-apart optical fibers passing therethrough. The primary substrate has first and second opposing surfaces and defines a plurality of N primary substrate apertures which each extend therethrough from the first surface to the second surface and have a cross-section which is greater than a cross-section of an optical fiber such that one of the N optical fibers can be inserted through each of the N primary substrate apertures. The layer is metal, is relatively thin, and engages one of the first and second opposing surfaces of the primary substrate, and defines N layer apertures therethrough. Centers of the layer apertures are aligned to a preselected tolerance value which is required for the array of elements.

66 Claims, 13 Drawing Sheets

OPTICAL FIBER ARRAY AND METHOD OF FORMATION

FIELD OF THE INVENTION

The present invention relates to method and apparatus for providing alignment of elements such as optical fibers in a predetermined array.

BACKGROUND OF THE INVENTION

Fiberoptics is used in the communication industry for high levels of data transport. As a result, optical fibers need to be coupled in with precision to semiconductors, detectors, and mirrors in arrays.

A method for obtaining precision accuracies is to use photolithography to image a mask of array openings on a substrate such as silicon. Silicon is chosen because it has a low thermal coefficient equal to that of silicon substrates that optical fibers match into. Using a photolithographic mask, the openings of the array are etched in the silicon wafers. The problem with this method is that to produce an accurately sized opening, plasma etching must be performed anisotropically which produces a near vertical opening. For small openings such as those for 125 micrometer diameter single mode optical fibers which are nominally 124–126 micrometers in diameter, the depth of the etched opening in the silicon substrate is nominally 500–700 micrometers. This etching can be performed with Reactive Ion Etching which is a very slow process that produces a steep narrow opening at both ends of the substrate. The slow etch rate makes it costly to fabricate, and the small opening size makes it difficult to insert the optical fiber into the opening during array fabrication.

If a silicon substrate is etched faster with standard plasma etching or with wet chemical etching, the etching is isotropic. The problem with such faster etching technique is that there is less control over the size of the openings at both ends of the substrate because of non-uniform etch rates across the face of the substrate. As a result, the openings can have large variations in diameter and, consequently, cause inaccuracies in the placement of optical fibers in the plane of the substrate.

A prior art optical fiber array connector uses a substrate having rear and forward surfaces and a plurality of openings that communicate through these surfaces. Each opening in the mask element or substrate is laser drilled and has a diameter which is smaller than the outer diameter of a cladding of an optical fiber to be inserted therethrough. Each opening is either cylindrical in shape or flared outwards from the rear to the forward surface. Each of the plurality of optical fibers has an end having truncated side surfaces forming a cone that extends through a separate opening of the substrate so that the conical surface of the optical fiber engages the circumference of the separate opening adjacent the rear surface of the substrate where the two diameters are equal. After the plurality of optical fibers are inserted into their respective openings in the substrate, the optical fibers are bonded to the substrate by applying a bonding (adhesive) material over the forward surface of the substrate which also fills the remaining openings between the conical surfaces of the optical fibers and the substrate. The exposed conical tips of the optical fibers and the bonding material are then ground and polished to truncate the cones and expose the optical fiber core diameters.

One problem presented with this type of prior art optical fiber array connector is that the taper etching of the optical fiber has to be uniform to assure self-centering. The insertion of just the conical tip of the optical fiber can present other problems with annular alignment as well as bonding (attaching) of the optical fiber to the substrate. There can also be a large variation in the size of each opening during etching or laser drilling. This means that some of the openings could be larger than the diameter of the optical fiber. This can cause inaccuracies in the placement of the optical fiber. If an opening is too small, it can present problems in firmly securing the tips of the optical fibers with epoxy or other bonding material.

It is desirable to provide an array of elements, such as optical fibers, in which alignment (i.e., center-to-center spacings of the elements) of ±2.0 micrometers is repeatedly achievable using current photolithography and electroforming technology.

SUMMARY OF THE INVENTION

The present invention is directed to method and apparatus for providing alignment of an array of elements such as optical fibers to a preselected center-to-center tolerance value.

From a first apparatus aspect, the present invention is an optical fiber array apparatus. The optical fiber apparatus comprises a relatively thick primary substrate and a relatively thin first layer. The relatively thick primary substrate has sufficient structure to support an array of N spaced-apart optical fibers, has first and second opposing surfaces, and defines a plurality of N primary substrate apertures which each extend therethrough from the first surface to the second surface. A cross-section of each of the N substrate apertures is greater than a cross-section of an optical fiber such that one optical fiber can be passed through in each of the N primary substrate apertures. Each optical fiber comprises a cladding layer surrounding an optical core. The relatively thin first layer, which has insufficient structure by itself to support an array of N spaced-apart optical fibers, engages the second surface of the primary substrate and defines N apertures therethrough with centers of the first layer apertures being aligned to a preselected tolerance value which is that required for the array of optical fibers. The size of the cross-section of each of the first layer apertures is less than the size of the cross-section of each primary substrate aperture. Each first layer aperture is within a footprint of one of the primary substrate apertures such that optical fibers inserted through the primary substrate apertures enter the first layer apertures. The cross-sections of the first layer apertures having limited variations that result in spacings between adjacent optical fibers placed in the primary substrate apertures and entering the first layer apertures being within the preselected tolerance value such that optical fibers are aligned within the preselected tolerance value.

From a second apparatus aspect, the present invention is an optical fiber array apparatus. The optical fiber apparatus comprises a relatively thick primary substrate and a relatively thin layer. The relatively thick primary substrate has sufficient structure to support an array of N spaced-apart optical fibers, has first and second opposing surfaces, and defines a plurality of N primary substrate apertures which each extend therethrough from the first surface to the second surface with a cross-section of each of the N substrate apertures being greater than a cross-section of an optical fiber such that one optical fiber can be passed through in each of the N primary substrate apertures. Each optical fiber comprises a cladding layer surrounding an optical core. The relatively thin first layer, which has insufficient structure by itself to support an array of N spaced-apart optical fibers, engages the second surface of the primary substrate and defines N apertures therethrough with centers of the first layer apertures being aligned to a preselected tolerance value which is that required for the array of optical fibers. The size of a portion of a cross-section of each of the first layer apertures is less than the size of the cross-section of each primary substrate aperture and is greater than the cross-section of a cladding layer and an optical core. Each first layer aperture is within a footprint of one of the primary substrate apertures such that the cladding layers and the surrounded optical cores inserted through the primary substrate apertures pass can pass through the first layer apertures. The cross-sections of the first layer apertures have limited variations that result in spacings between the cladding layers of adjacent optical fibers passing through the primary substrate apertures and the first layer apertures being within the preselected tolerance value such that the optical fibers are aligned within the preselected tolerance value.

From a first method aspect, the present invention is a method of forming an array apparatus, which supports N spaced-apart optical fibers to a preselected tolerance value. The method comprises the steps of: (a) forming, in a relatively thick primary substrate having sufficient structure to support an array of N spaced-apart optical fibers, N substrate apertures which each extend therethrough from a first surface of the primary substrate to a second surface of the primary substrate with a cross-section of each of the N primary substrate apertures being greater than a cross-section of an optical fiber such that one optical fiber can be passed through each of the N primary substrate apertures; (b) forming a relatively thin first layer defining N apertures therethrough with centers of the layer apertures being aligned to the preselected tolerance value which is that required for the array of optical fibers, the size of the cross-section of each of the layer apertures being less than the size of the cross-section of each primary substrate aperture; (c) locating the relatively thin first layer on the second surface of the primary substrate with each first layer aperture being within a footprint of one of the primary substrate apertures such that optical fibers inserted through the primary substrate apertures make contact with the first layer apertures, and the cross-sections of the first layer apertures having limited variations that result in spacings between adjacent optical fibers placed in the primary substrate apertures and in contact with the first layer apertures such that the optical fibers are aligned within the preselected tolerance value; (d) inserting each of the N optical fibers through a separate aperture in the primary substrate and through a separate aperture in the first layer which is within the footprint of the primary substrate aperture; and (e) applying a bonding material to the plurality of N optical fibers in their associated apertures in the primary substrate so as to attach the N optical fibers to the primary substrate with the optical fibers being aligned to the preselected tolerance value.

From a second method aspect, the present invention is a method of forming an optical fiber array apparatus, which comprises an array of N spaced-apart optical fibers aligned to a preselected tolerance value. The method comprises the steps of: (a) forming, in a relatively thick primary substrate having sufficient structure to support an array of N spaced-apart optical fibers, N substrate apertures which each extend therethrough from a first surface of the primary substrate to a second surface of the primary substrate with a cross-section of each of the N primary substrate apertures being greater than a cross-section of a cladding layer and optical layer of an optical fiber such that the cladding layer of an optical fiber can be passed through each of the N primary substrate apertures; (b) electroforming a relatively thin metal first layer defining N apertures therethrough with centers of the first layer apertures being aligned to the preselected tolerance value which is that required for the array of N spaced-apart optical fibers, the size of the cross-section of each of the first layer apertures being less than the size of the cross-section of each primary substrate aperture; (c) locating the relatively thin metal first layer on the second surface of the primary substrate with each first layer aperture being within a footprint of one of the primary substrate apertures such that optical fibers inserted through the primary substrate apertures make contact with the first layer apertures, and the cross-sections of the first layer apertures having limited variations that result in spacings between adjacent optical fibers placed in the primary substrate apertures and in contact with the first layer apertures such that the optical fibers are aligned within the preselected tolerance value; (d) inserting each of the N optical fibers through a separate aperture in the primary substrate and through a separate aperture in the first layer which is within the footprint of the primary substrate aperture; and (e) applying a bonding material to the plurality of N optical fibers in their associated apertures in the primary substrate so as to attach the N optical fibers to the primary substrate with the optical fibers being aligned to the preselected tolerance value.

The invention will be better understood from the following more detailed description taken with the accompanying drawings and claims.

The drawings are not necessarily to scale.

DETAILED DESCRIPTION OF THE INVENTION

It is to be understood that corresponding elements having the same function in the several views of the drawings are provided with the same designation numbers. It is to be understood that the description of the present invention hereinafter is directed to forming arrays with single mode or multimode optical fibers, but that the principles of the present invention can also be applied to other elements such as electrical wires.

Figure 1:
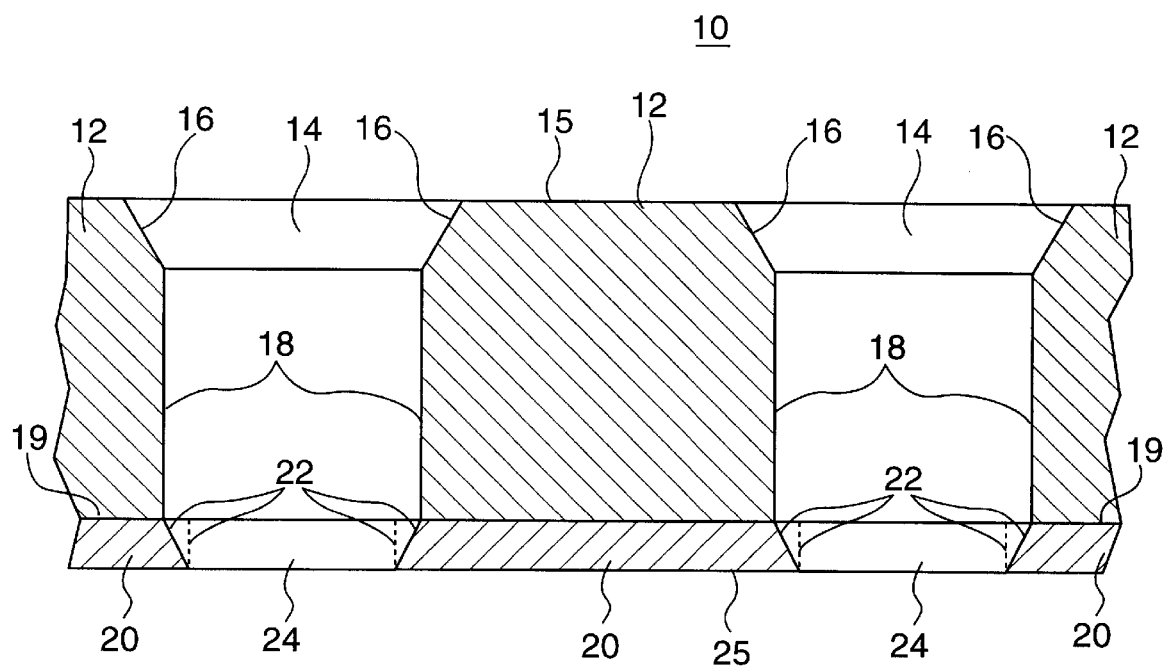
FIG. 1 is a cross-sectional side view of a section of a substrate array for mounting elements such as optical fibers in accordance with the present invention.

Referring now to FIG. 1, there is shown a cross-sectional side view of a section of a substrate array 10 for supporting and aligning (registering) an array of elements (e.g., optical fibers) with center-to-center spacing of a preselected value in accordance with the present invention. The substrate array 10 comprises a relatively thick primary substrate 12 and a relatively thin layer 20 of material. Primary substrate 12 can comprise, for example, Macor™ (a trademark of Corning), ceramic, silicon, plastic, or other suitable low-thermal coefficient material. Macor™ is presently the preferred material since it is machineable. Layer 20 can be a metal foil which is preferably but not necessarily electroformed. The layer 20 may also be denoted as electroformed foil 20 or electroformed foil layer 20. The primary substrate 12 has a top surface 15 and has cylindrical apertures 14 formed therethrough in a predetermined pattern which have the form of inwardly sloped sides 16 extending from a first surface 15 of the primary substrate 12 that extend into a cylindrical form for the remainder of the aperture to an opposing surface 19 of the primary substrate 12. The apertures 14 can also be formed without the inwardly sloping sides 16 which only aid in directing an optical fiber into the aperture 14. Each aperture 14 has a diameter which is greater than an outside diameter of a cladding layer 34 of an optical fiber 30 (shown in FIG. 2) to be inserted therethrough when the substrate array 10 is used for optical fibers. The sizes of the cross-sections of the apertures 14 in the primary substrate 12 have possible variations that could result in center-to-center spacing (alignment, registration) between the optical fibers placed in the apertures 14 that is outside a preselected tolerance value.

The layer 20 can be formed from any suitable material such 10 as a metal comprising, for example, nickel cobalt (NiCo), stainless steel, carbon steel, or aluminum. It can be formed by known technologies such as hot rolling, etching, machining, or electroforming. The openings 24 in layer 20 can be formed by etching, machining, mechanical or laser drilling, or electroforming a foil. The layer 20 is typically in the range of 1 to 6 mils thick. A preferred method of making the layer 20 is to form an electroformed foil by depositing NiCo or other electroplating metals onto a photographically produced conductive patterned surface such as glass or stainless steel master substrate. Once the electroformed plating material has been built up to the desired thickness (e.g., 1–6 mils) with precision apertures 24 formed therethrough, the electroformed foil layer 20 is stripped away from the master substrate, yielding a high quality duplicate of the pattern on the master substrate. Where apertures are part of the master pattern, the apertures may include a tapered side where the taper can be controlled by the plating process, or a straight wall not including a taper. With the use of glass master substrates for electroforming, superior edge definition and dimensional control can be obtained. For example, precision metal patterns with cross-section ratios of up to 1:1, and resolutions of over 2 million apertures per square inch are possible. The ability to obtain multiple precise electroformed foils 20 from one master patterned substrate (depending on the thickness of the electroformed foils) provides a very economical approach to obtaining the electroformed foils. Preferably, the metal electroformed foil is formed from nickel cobalt (NiCo) and is no more than 4 mils thick which can be used for tolerances of ±1 microns in the aperture patterns. One limitation of a relatively thin electroformed foil layer is that it typically has insufficient structure to support an array of optical fibers passing through apertures thereof.

The layer 20 is mounted on the opposing surface 19 of the primary substrate 12, and has apertures 24 formed therethrough which have cross-sections which are smaller than the cross-section of the apertures 14 in the primary substrate 12 and lie within a footprint of a corresponding one of the apertures 14 in the primary substrate 12. The layer 20 is mounted on a lower surface 19 of the primary substrate 12 by any suitable means such as bonding (not shown) or using aligning pins (not shown) with an exposed lower surface 25. The apertures 24 have inwardly sloped sides 22 so that narrowest portion of the aperture 24 is located at the exposed lower surface 25. Optionally, the sides 22 can be vertical as is indicated by the dashed vertical lines. In a preferred embodiment the apertures 24 are larger than the diameter of a cladding layer 34 surrounding a core 36 of an optical fiber 30 (shown in FIG. 2). In other embodiments the apertures 24 can be smaller than the cladding layer 34. The optical fiber 30 is inserted into the aperture 14 and passes therethrough and comes into contact with the aperture 24. Optical fiber 30, in a portion where the jacket 32 (see FIG. 2) has been removed, can have a cylindrical or tapered end (see FIG. 2). For purposes of descriptions of FIGS. 3–8 hereinbelow, it is assumed that the optical fibers 30 to be mounted in the apertures 14 and 24 of the primary substrate 12 and layer 20 have cylindrical ends, a portion of a jacket 32 (see FIG. 2) has been removed, and the cladding layer 34 and the core 36 pass completely through an aperture 14 and an aperture 24. The cross-section size of each aperture 24, which in a preferred embodiment is designed to have a cross-section greater than the cross-section of a cladding layer 34 and an optical core 36, is selected such that no matter where the cladding layer 34 of an optical fiber 30 is located within an aperture 24, the optical fiber 30 is aligned to other optical fibers 30 in their respective apertures 24 to a preselected tolerance value. This means that the center-to-center spacing between adjacent optical fibers 30 is within the preselected tolerance value.

Figure 2:
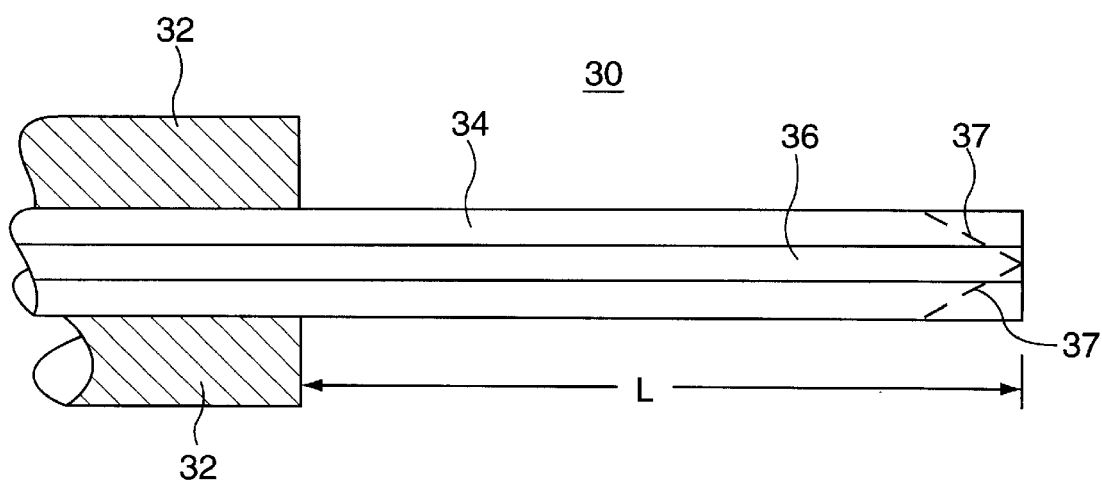
FIG. 2 is a cross-sectional side view through the center of an optical fiber which is to be inserted through an aperture of the substrate array shown in FIG. 1 in accordance with the present invention.

Referring now to FIG. 2, there is shown a cross-sectional side view through the center of an optical fiber 30 which is formed to mount in apertures 14 and 24 of the substrate array 10 shown in FIG. 1 in accordance with the present invention. The optical fiber 30 comprises a jacket 32 which surrounds the cladding layer 34 which surrounds the optical core 36. In preparation for insertion into an aperture 14 of the substrate array 10, the optical fiber 30 has its jacket 32 removed for a distance "L" from one end thereof. The end of the exposed portion of the cladding layer 34 can be optionally tapered (as shown by dashed lines 37) for ease of insertion into apertures 14 and 24 of the substrate array 10. Still further, the tapered end 37 of the optical fiber 30 can be used to register the optical fiber to a tapered side wall of the aperture 24 of the layer 20 as will be described hereinafter in reference to FIG. 10.

Figure 3:
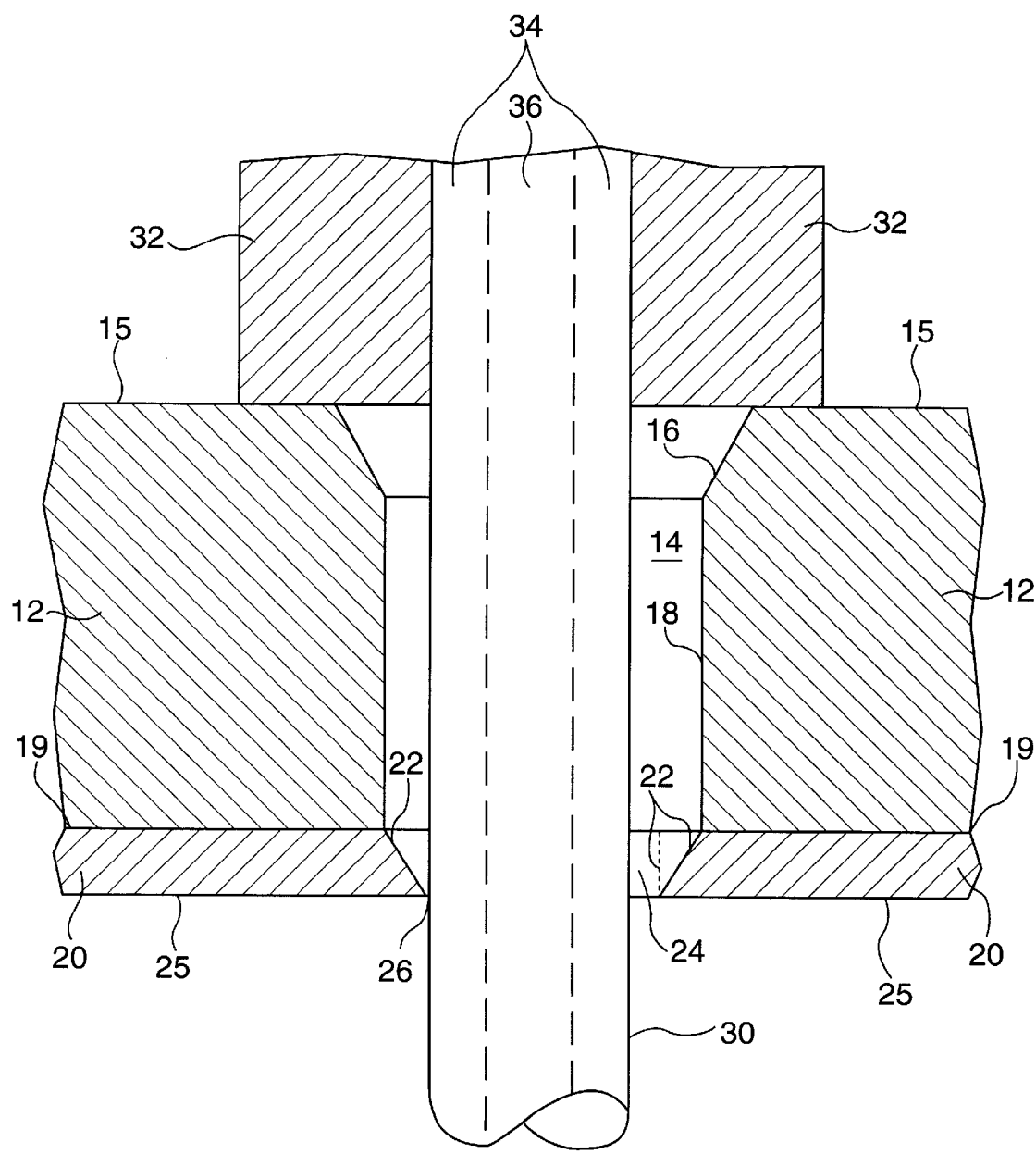
FIG. 3 is a cross-sectional side view of part of the optical fiber of FIG. 2 which has been inserted through an aperture of the substrate array of FIG. 1 in accordance with the present invention.

Referring now to FIG. 3, there is shown a cross-sectional side view of an optical fiber array apparatus 100 which comprises an optical fiber 30 of FIG. 2 after it is inserted through an aperture 14 of the primary substrate 12 and an aperture 24 of the layer 20 of a substrate array 10 shown in FIG. 1 in accordance with the present invention. The optical fiber 30 is shown with a terminated end of its jacket 32 engaging the top surface 15 of the primary substrate 12 with the exposed cladding layer 34 extending through the apertures 14 and 24 of the primary substrate 12 and the layer 20, respectively. The length "L" of the exposed cladding layer 34 is sufficient to extend through the apertures 14 and 24 and beyond the exposed lower surface 25 of the layer 20. The cladding layer 34 is typically further positioned in the aperture 24 of the layer 20 to engage two predetermined points 26 (only one of which is shown in FIG. 3) of the narrowest edge of the tapered sides 22 of the aperture 24 of the layer 20 as is explained below with respect to FIG. 4.

Figure 4:
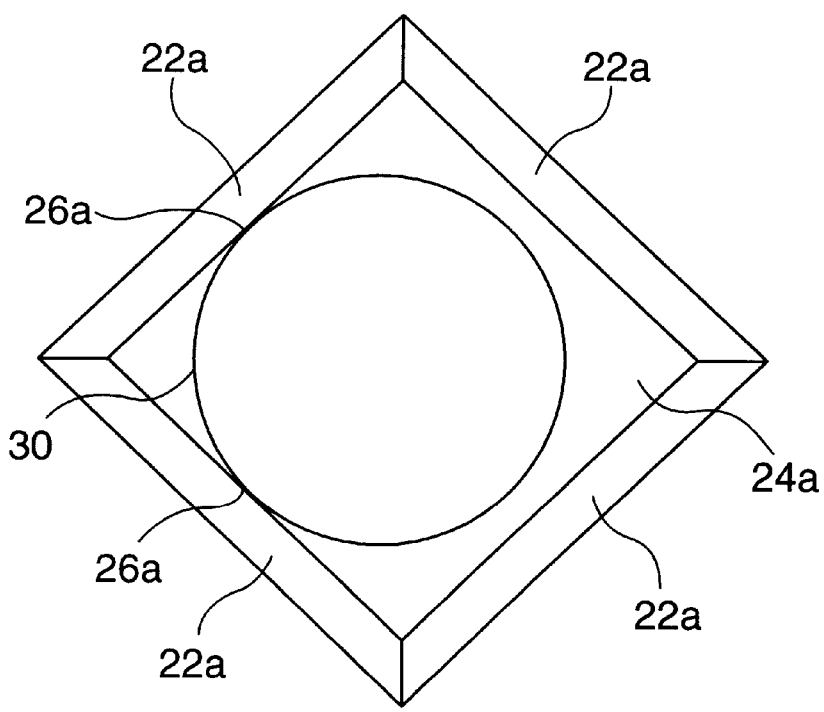
FIG. 4 shows a cross-sectional top view of a diamond shaped aperture formed in an electroformed foil which is a part of the substrate array of FIG. 1 with a cladding layer of the optical fiber of FIG. 2 inserted into the diamond shaped aperture in accordance with the present invention.

Referring now to FIG. 4, there is shown a cross-sectional top view of a diamond shaped aperture 24a formed in the layer 20 that is mounted on the primary substrate 12 of FIG. 1, and how the cladding layer 34 of the optical fiber 30 is typically positioned along two edges of the associated aperture 24a in accordance with the present invention. The aperture 24a includes inwardly tapered sides 22a towards a lower surface of the layer 20 as is shown in FIG. 1. The optical fiber 30 is positioned against bottom edges of the tapered sides 22a of the diamond shaped aperture 24a at the two points 26a where the cross-sectional area of aperture 24a is the smallest. In accordance with a preferred embodiment of the present invention, each aperture 24 in the layer 20 of FIG. 1 can comprise any suitable shape that is larger than the outer diameter of a cladding layer 34 of an optical fiber 30 to be mounted therein and permits the optical fiber 30 to be placed against at least one edge of a sidewall of primary substrate 10 which defines the aperture 24 to within a preselected alignment tolerance value for the array. As is shown in FIG. 3, once the plurality of optical fibers 30 are positioned in the apertures 14 and 24 or the substrate array 10 of FIG. 1, the cladding layers 34 of the optical fibers 30 are then simultaneously moved laterally until all cladding layers 34 contact at two points 26a in the sidewalls defining the apertures 24 of the layer 20 as shown, for example, in FIG. 4. When the optical fibers 30 are mounted in the substrate array 10, outer surfaces of the cladding layers 34 typically do not touch the sides 16 or 18 (shown in FIG. 1) of the apertures 14 in the primary substrate 12. With each of cladding layers 34 of the optical fibers 30 inserted through separate pairs of apertures 14 and 24, the optical fibers 30 are aligned to a preselected tolerance value independent of the location of each cladding layer 34 in apertures 14 and 24. The movement of cladding layer 34 against tapered sides 22a of the diamond shaped aperture 24a at the two points 26a further improves on the preselected tolerance value of the optical fibers 30.

Figure 5:
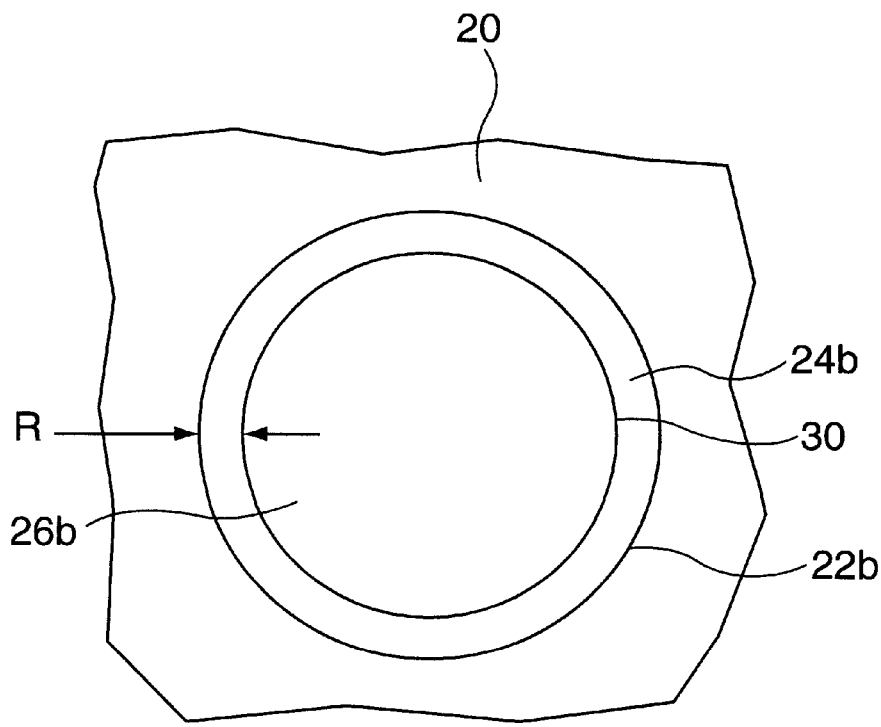
FIG. 5 shows a cross-sectional top view of a circular shaped aperture formed in an electroformed foil which is part of the substrate array of FIG. 1 as part of the substrate array of FIG. 1 with a cladding layer of the optical fiber of FIG. 2 inserted into the circular shaped aperture in accordance with an alternative arrangement in accordance with the present invention.

Referring now to FIG. 5, there is shown a cross-sectional top view of a cylindrically shaped aperture 24b formed in a layer 20 that is mounted on the primary substrate 12 of FIG. 1, and how an optical fiber 30 of FIG. 2 is typically positioned in the aperture 24b in accordance with the present invention. The aperture 24b in the layer 20 has a cylindrical shape and a diameter which is slightly larger than a cross-section of the optical fiber 30 to be mounted therein. The aperture 24b is formed such that a difference of a value "R" exists between the side walls 22b of the aperture 24b and the outer surface of the optical fiber 30 when they are aligned. The difference "R" is chosen to align (register) the optical fiber 30 within the aperture 24 to a predetermined tolerance value (e.g., ±1.5 microns) in the array regardless of where the optical fiber 30 is found in the aperture 24b. For example, with a 128 micron diameter aperture 24b in the layer 20, an optical fiber 30 with a 125 micron diameter can be placed anywhere in the aperture 24b (left, right, top, bottom) and still be within ±1.5 microns of the center of the aperture 24b. Such ±1.5 micron variation is within the preselected tolerance value for the array. If all of the cladding layers 34 are moved to be located against the same portion of the curved sidewall of their cylindrical aperture 24b, then an alignment better than the preselected tolerance value of the optical fibers 30 can be achieved. This improved tolerance value may be selected as the preselected tolerance value.

Figure 6:
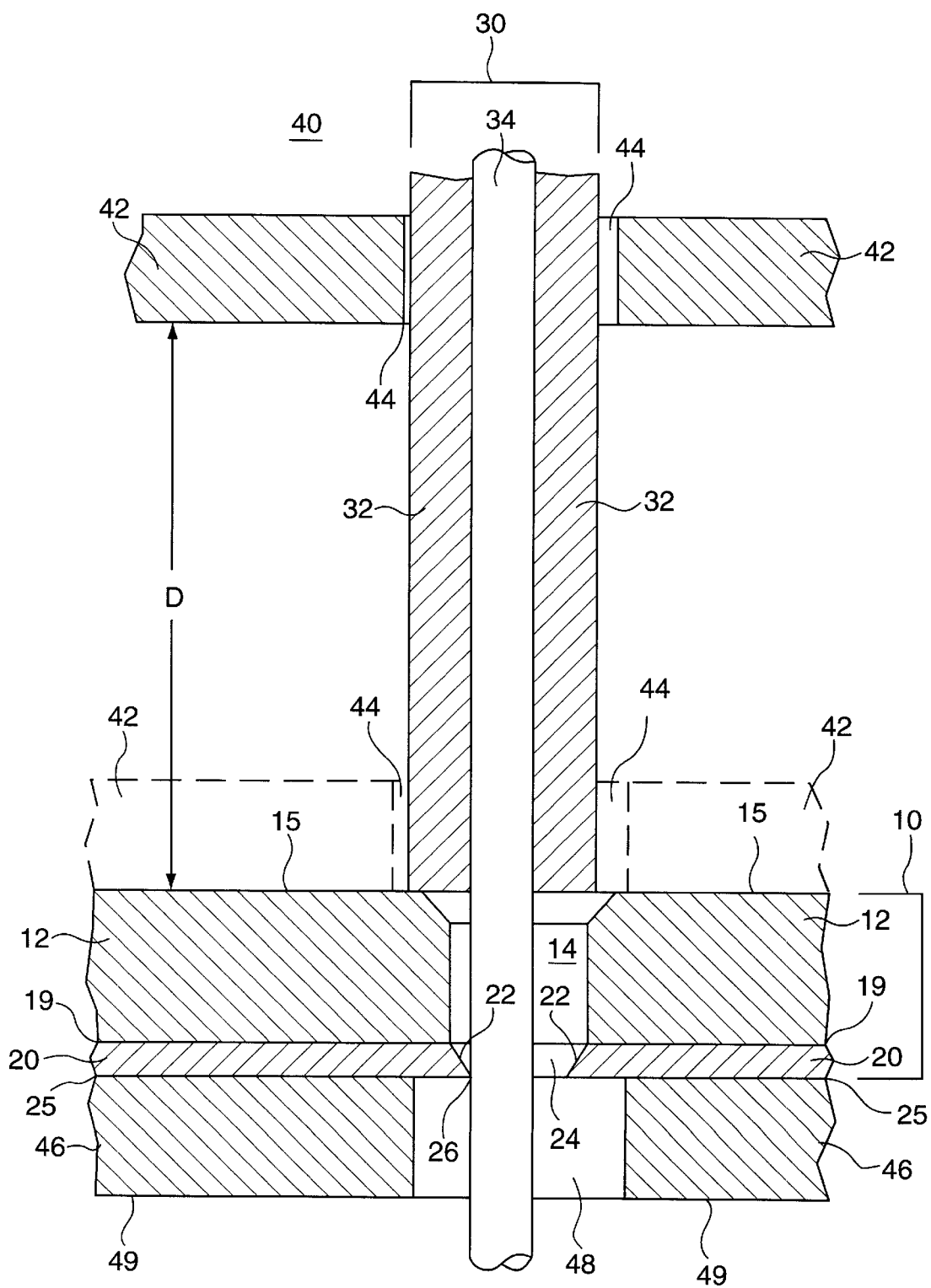
FIG. 6 shows a cross-sectional side view of an arrangement for mounting each optical fiber shown in FIG. 2 in the substrate array of FIG. 1.

Referring now to FIG. 6, there is shown an arrangement 40 for mounting a plurality of optical fibers 30 (only one of which is shown) in the substrate array 10 of FIG. 1 so as to facilitate the optical fibers 30 having a predetermined precision angular alignment in the substrate array 10. The arrangement 40 comprises a substrate array 10 (shown in FIG. 1), an angular alignment substrate 42, and a vacuum substrate 46. The substrate array 10 comprises the primary substrate 12 and the layer 20 shown in FIG. 1 that define the apertures 14 and 24, respectively, where each of the apertures 24 lie within a footprint of the corresponding aperture 14 of the substrate array 10.

In one embodiment the angular alignment substrate 42 initially engages an exposed top surface 15 of the primary substrate 12 (as is shown by the dashed outline), and has formed therethrough a plurality of apertures 44 whose centers are preferably aligned with the centers of the apertures 14 in the primary substrate 12. Each of the apertures 44 in the angular alignment primary substrate 42 has a diameter which is larger than an outer diameter of a jacket 32 of an optical fiber 30 that is to be positioned therethrough. Preferably, the angular alignment substrate 42 is referenced to the primary substrate 12 [e.g., by pins or other suitable arrangement (not shown)] so that the apertures 44 and 14 preferably have their centers aligned and that the two substrates 12 and 42 can be vertically moved apart.

The vacuum substrate 46 [which may be denoted as a registering (aligning) and tension applying means] initially engages the exposed lower major surface 25 of the layer 20 of the substrate array 10, and has apertures 48 formed therethrough whose centers align with the centers of the apertures 24 in the layer 20. Each of the apertures 48 in the vacuum substrate 46 has a diameter which is greater than the apertures 14 and 24 in the primary substrate 12 and the layer 20, respectively, of the substrate array 10 to permit an exposed end of an associated optical fiber 30 to easily pass through the aperture 48.

In one method that can be used to mount a plurality of optical fibers 30 in the substrate array 10, the angular alignment substrate 42 is initially placed in engagement with the primary substrate 12 of the substrate array 10 (as is shown by the dashed line outline) so that the apertures 44 are in alignment with the apertures 14 in the primary substrate 12. Vacuum is then applied along both the exposed lower surface 49 and the apertures 48 of the vacuum substrate 46. Either one of the angular alignment substrate 42 or the substrate array 10 is then moved vertically relative to the other to provide a predetermined distance "D" therebetween to facilitate achieving a precision predetermined angular alignment (e.g., perpendicular) of each optical fiber 30 with respect to the primary substrate 12. With the vacuum applied to the vacuum substrate 46, the combination of a cladding layer 34 and the core 36 it surrounds (shown in FIG. 2) of each of the optical fibers 30 is threaded through a separate aperture 44 of the angular alignment substrate 42 and the corresponding apertures 14 and 24 of the primary substrate 12 and the layer 20, respectively. Vacuum along the exposed lower surface 49 of the vacuum substrate 46 helps to facilitate the threading of each optical fiber 30 by providing a negative pressure to draw the cladding layer 34 and core 36 (shown in FIG. 2) of each optical fiber 30 through the corresponding apertures 44, 14, 24, and 48 in the angular alignment substrate 42, the primary substrate 12, the layer 20, and the vacuum substrate 46, respectively.

Since the apertures 44 in the angular alignment substrate 42 are only somewhat larger than the jacket 32 of the optical fibers 30, the optical fiber 30 may bend and touch somewhere on a side of the aperture 44. However, the orthogonality error that may be produced by such bending can be easily computed using the width of the aperture 44 in the annular alignment substrate 42, the width of the optical fiber 30 in the aperture 44, and the distance "D" between the annular alignment substrate 42 and the primary substrate 12. Although the error may be caused by a slight angle change of the optical fiber 30 from, for example, vertical, the error can be kept within desired bounds by a proper adjustment of the widths of the apertures 44 in the annular alignment substrate 42 and the distance "D". As a result of the optical fiber 30 mounting (insertion) process, the ends of the jackets 32 are drawn against the exposed surface 15 of the primary substrate 12 by the vacuum applied to the vacuum substrate 46, and the optical fibers 30 are aligned in a substantially vertical manner in the associated apertures 14 and 24 defined in the substrate array 10 by the angular alignment substrate 42.

In a preferred method the angular alignment substrate 42 is held in the upper shown position separated from the top surface 15 of primary substrate 12 by the distance D and the optical fiber 30 is inserted through aperture 44 until the jacket 32 contacts the top surface 15 of primary substrate 12 with the cladding layer 34 passing through apertures 14, 24, and 48.

Figure 7:
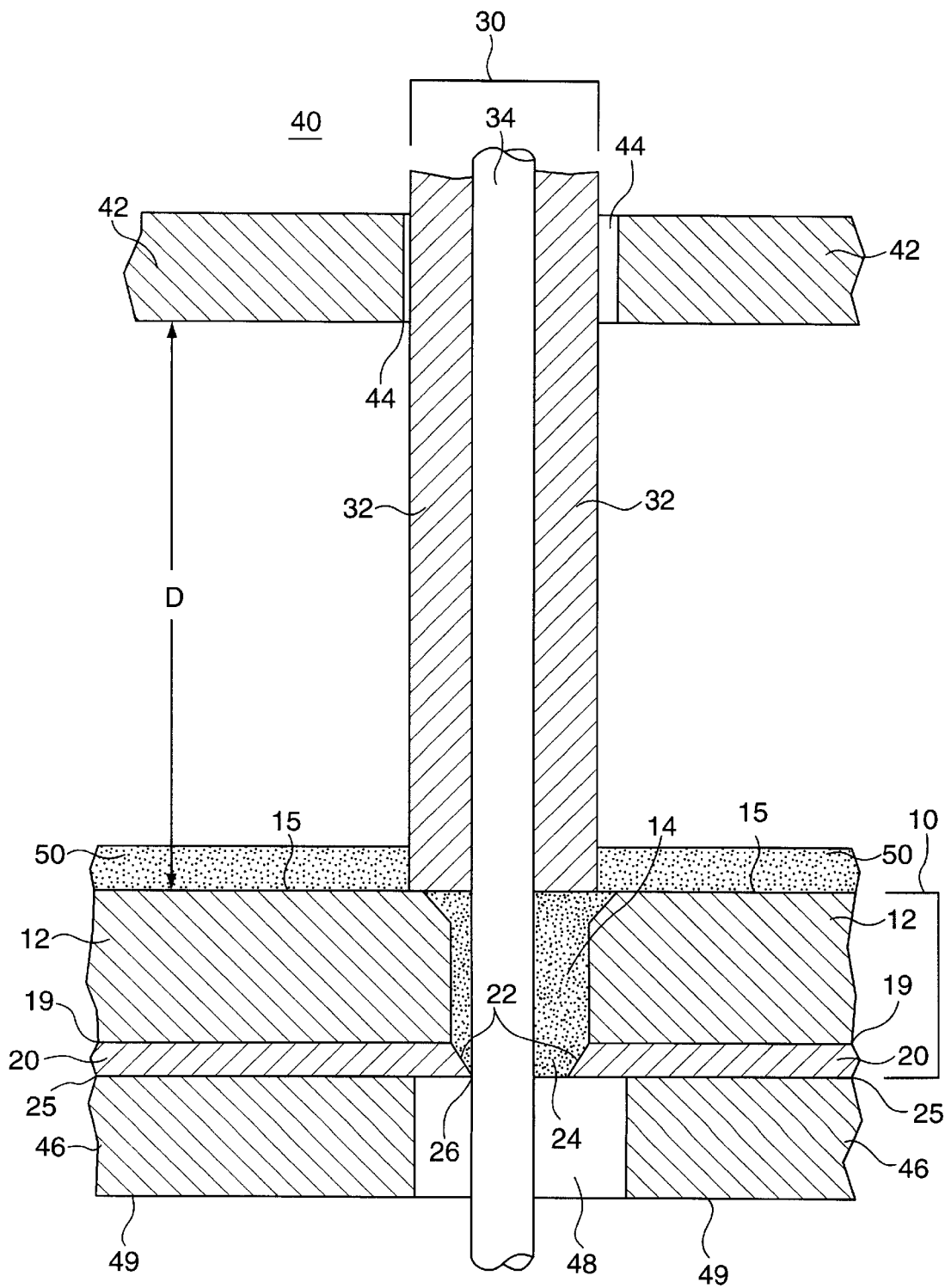
FIG. 7 shows the arrangement of FIG. 6 for bonding (attaching) each optical fiber of a plurality of optical fiber mounted in the substrate array of FIG. 1 in accordance with the present invention.

Referring now to FIG. 7, there is shown the arrangement 40 of FIG. 6 after an optical fiber 30 of a plurality of optical fibers 30 is mounted in the substrate array 10 of FIG. 1 and a bonding (adhesive) material 50 is applied in accordance with the present invention. Once the optical fibers 30 are mounted in the arrangement 40, as was described hereinbefore with regard to FIG. 6, a suitable bonding material 50 such as, for example, an epoxy or suitable resin, is applied over the exposed surface 15 of the primary substrate 12.

Preferably, although not shown, the optical fiber 30 is lifted up so that there exists some space (not shown) between exposed ends of the jacket 32 and the surface 15 of primary substrate 12 so as to facilitate some bonding material 50 flowing into this space and to more easily flow into the aperture 14. The negative pressure from the vacuum applied (not shown) to the exposed surface 49 and the apertures 48 of the vacuum substrate 46 applies a tension on the optical fibers 30 in the apertures 14 and 24 of the primary substrate 12 and layer 20. The vacuum also helps to pull the bonding material 50 into the exposed portions of the apertures 14 and 24 of the substrate array 10. This ensures that the bonding material 50 bonds the jackets 32 of the optical fibers 30 to the top surface 15 of the primary substrate 12, and generally fills the apertures 14 and 24 surrounding the cladding layers 34 of the optical fibers 30 to prevent the optical fibers 30 from moving from their aligned position and to provide strain relief to the optical fibers 30.

Figure 8:
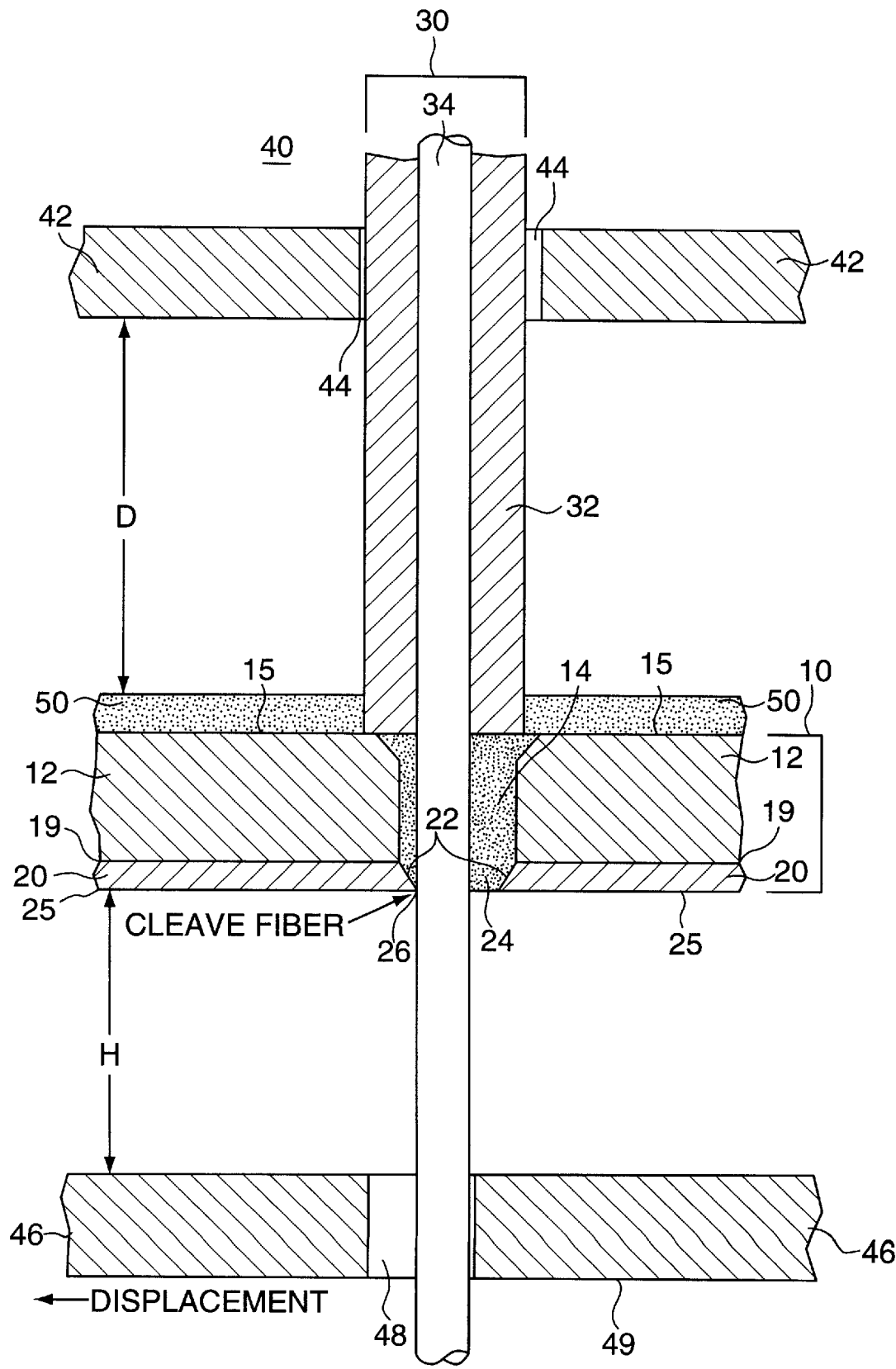
FIG. 8 shows the arrangement of FIG. 7 for aligning (registering) the optical fibers in place while maintaining tension on the optical fibers in the arrangement of FIG. 7 in accordance with the present invention.

Referring now to FIG. 8, there is shown a cross-sectional side view of the arrangement 40 of FIG. 7 for registering the optical fibers 30 in place while maintaining tension on the optical fibers 30 in accordance with the present invention. Once the bonding material 50 has been applied and drawn into the apertures 14 and 24 of the substrate array 10, the vacuum substrate 46 is displaced vertically away from the layer 20 by a predetermined distance "H". With vacuum only being applied to the bottom surface 49 and the apertures 48 of the displaced vacuum substrate 46, tension is still being applied on the optical fibers 30. This tension holds the ends of the jackets 32 of the optical fibers 30 against the surface 15 of the primary substrate 12 and the cladding layers 34 are being held taught through the aperture 48 of the vacuum substrate 46. With the tension applied to the optical fibers 30 by the vacuum and the bonding material 50 still not cured, the vacuum substrate 46 is displaced sideways in a predetermined direction so that the cladding layer 34 and core 36 (shown in FIG. 2) of the optical fibers 30 are concurrently moved to align (register) each of the optical fibers 30 at two similar points 26a on the associated tapered apertures 24 of the layer 20 as is shown, for example, in FIG. 4. Once the optical fibers 30 are so positioned in the apertures 24 of the layer 20, the vacuum substrate 46 is held in place until the bonding material 50 has cured.

After the bonding material 50 has cured, the vacuum substrate 46 can be removed and used for forming a next same substrate array 10. The angular alignment substrate 42 can also be attached to a mounting fixture (not shown), or optionally returned to engage the surface 15 of the primary substrate 12 as is shown in the dashed line position in FIG. 6. A bonding material can be applied to bond the angular alignment substrate 42 to the primary substrate 12, and also to fill the apertures 44 therein to further bind the optical fiber 30 and its jacket 32 to the primary substrate 12 and thus provide additional strain relief.

Each optical fiber 30 is then cleaved at a predetermined level below the layer 20. Any exposed bonding material 50 from the apertures 24 of the layer 20 and the exposed tips or ends of the optical fibers 30 are then ground and polished in order to truncate (not shown) ends of the optical fibers 30 at the surface 25 of the layer 20.

Figure 9:
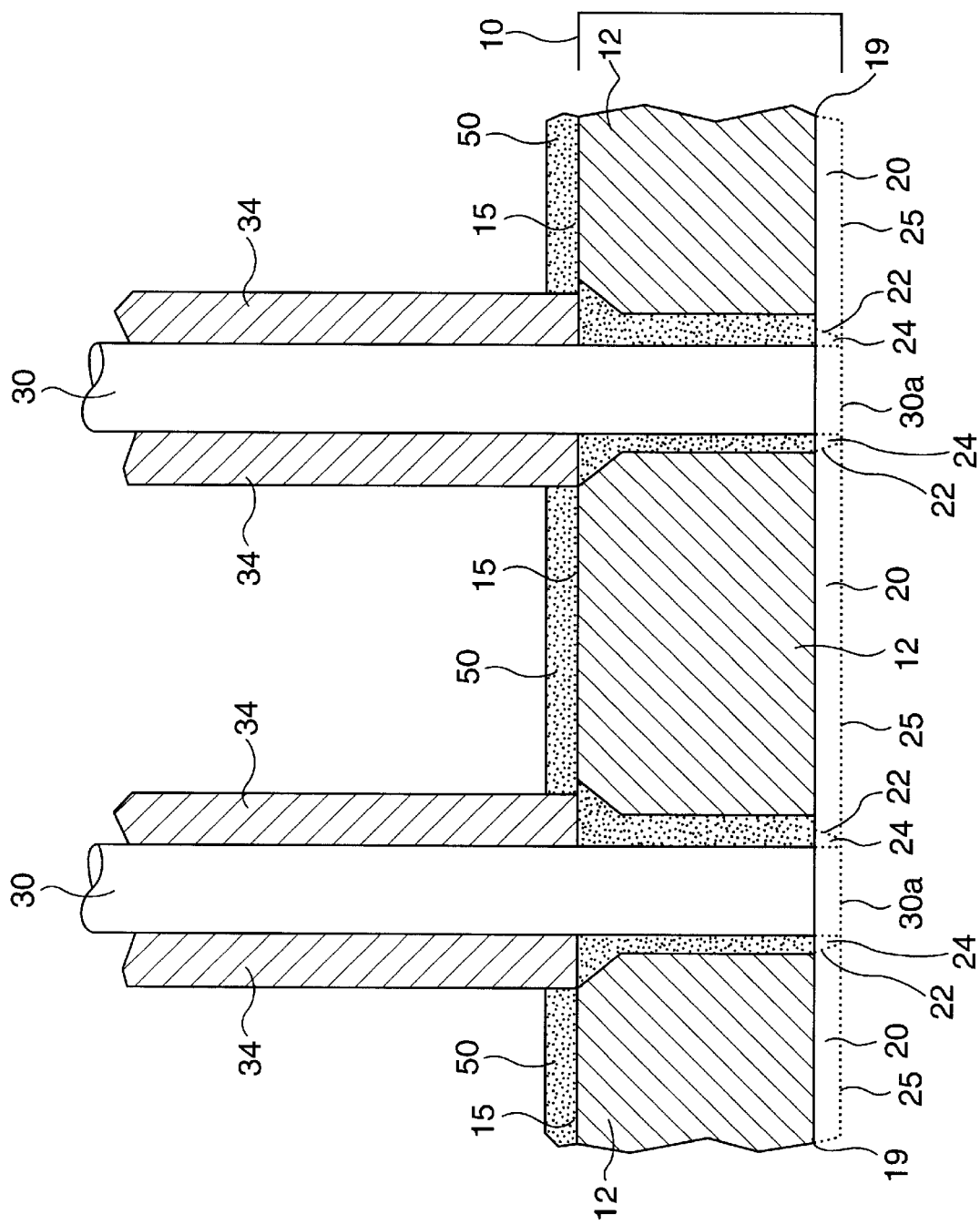
FIG. 9 shows a cross-sectional side view of a completed substrate array wherein optical fibers of FIG. 2 are mounted and secured in associated apertures of the substrate array of FIG. 1 in accordance with the present invention.

Referring now to FIG. 9, there is shown a cross-sectional side view of a completed substrate array 10 wherein optical fibers 30 of FIG. 2 are mounted and secured in associated cylindrical apertures 14 and 24 of the substrate array 10 of FIG. 1 in accordance with the present invention. This structure may be referred to as apparatus or optical fiber array apparatus. The cylindrical apertures 14 and 24 in the primary substrate 12 and layer 20 (shown as a dashed line layer), respectively, in the substrate array 10 have the top view as is shown in FIG. 5. As was described for the arrangement of FIG. 5, when the optical fibers 30 are threaded through the apertures 24 in the layer 20, the optical fibers 30 are automatically registered with a predetermined dimensional tolerance (e.g., ±1.5 microns) in the substrate array 10 regardless of where the optical fiber 30 is found in the aperture 24. Once the optical fibers 30 are bonded in their registered place by the bonding material 50, the optical fibers 30 can be cleaved at a predetermined location below the layer 20. Since the primary substrate 12 is relatively thick and can support the plurality of optical fibers 30 of the array by itself, the layer 20 can be removed from engagement with the surface 19 of the primary substrate 12 by any suitable technique such as, for example, etching or chemical mechanical polishing. The purpose of the layer 20 was to only position the plurality of optical fibers 30 in the apertures 14 of the primary substrate 12. Therefore, once the optical fibers 30 are permanently bonded in the apertures 14, the layer 20 is no longer required and can be removed, as is indicated by the dashed line shown for layer 20. The ends of the optical fibers 30 are then typically ground and polished to remove the portions 30a below the surface 19 of the primary substrate 12.

Figure 10:
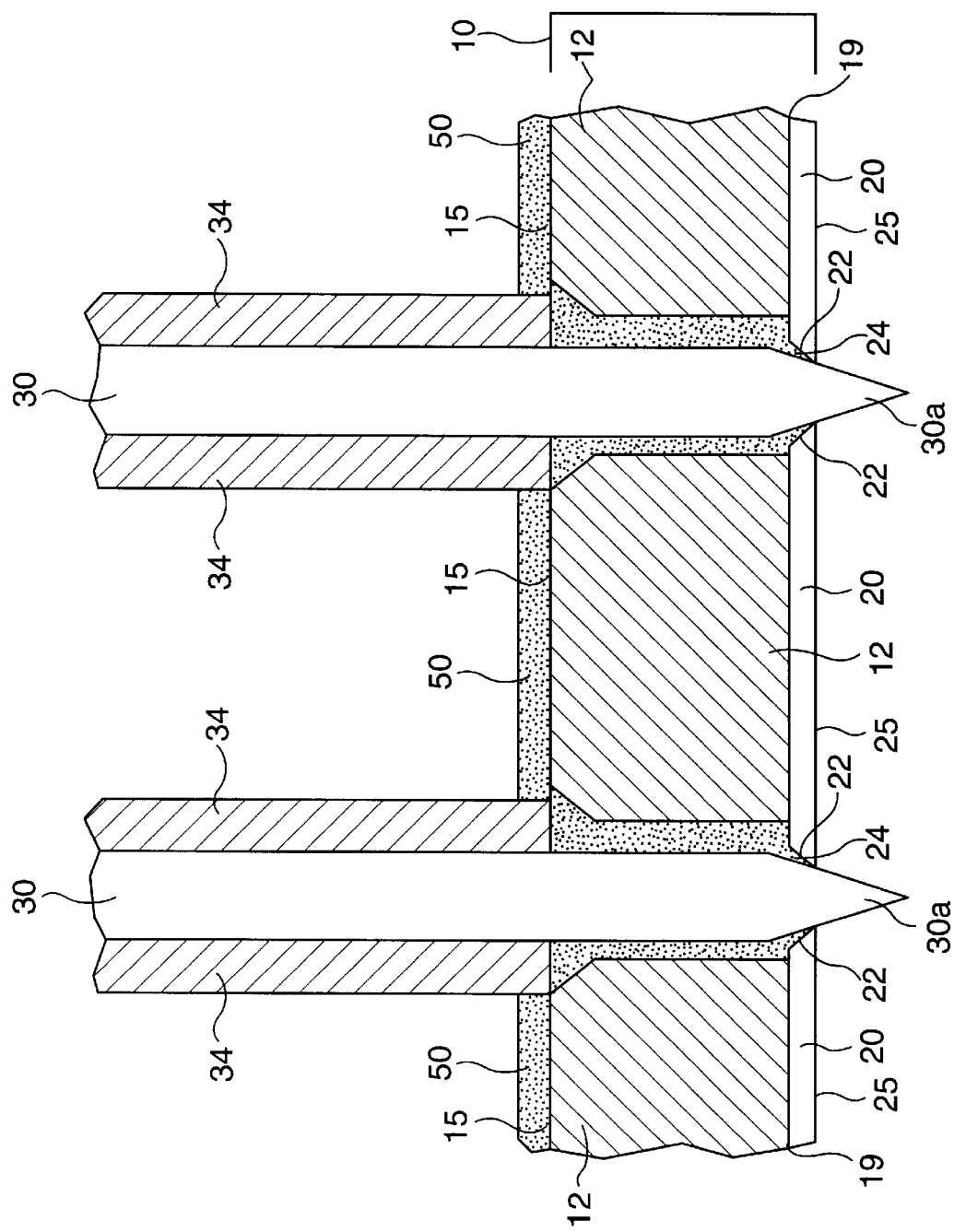
FIG. 10 shows a cross-sectional side view of a completed substrate array wherein optical fibers of FIG. 2 are mounted and secured in associated apertures of the substrate array of FIG. 1 in accordance with the present invention.

Referring now to FIG. 10, there is shown a cross-sectional side view of a completed substrate array 10 wherein optical fibers 30 of FIG. 2 are mounted and secured in associated apertures 14 and 24 of the substrate array 10 of FIG. 1 in accordance with the present invention. The cylindrical apertures 24 in the layer 20 in the substrate array 10 have tapered side walls 24 whose cross-section is smaller than a cross section of the cladding layer 34 of the optical fiber 30 shown in FIG. 2 that is mounted therein. Each optical fiber 30 has a tapered end 30a which engages the surface of the taper of the corresponding aperture 24 in the layer 20 and is automatically aligned (registered) to adjacent optical fibers 30 with a preselected tolerance value (e.g., ±1.5 microns) in the substrate array 10. The primary purpose of layer 20 is to align (register) the optical fibers 30 in the apertures 14 of the primary substrate 12 such that the center-to-center spacing is within a preselected tolerance value. Therefore, once the optical fibers are permanently bonded in the apertures 14, the layer 20 is no longer required and optionally can be removed using a variety of techniques including etching and mechanical chemical polishing. The ends of the optical fibers 30 are then ground and polished to, for example, the bottom surface 19 of primary substrate 12.

From FIGS. 1–10 and the description thereof, the present invention provides apparatus and method wherein a substrate array 10 for optical fibers 30 or other elements is produced. The assembly process comprises the steps of:

1. Generating a relatively thin layer 20 of a predetermined thickness (e.g., 0.0025") and with apertures 24 having centers aligned to a preselected tolerance value by electroforming and carefully controlled diameters to provide center-to-center alignment of the optical fibers 30 or other elements within the predetermined tolerance value.
2. Machining a relatively thick primary substrate 12 of a suitable material such as Macor™ that includes cylindrical apertures 14 that have a cross-section which are larger than, and correspond to locations of the apertures 24 in the layer 20. Additional apertures (not shown) for optional alignment pins (not shown) are machined in the primary substrate 12.
3. Using an angular alignment substrate 42, which defines aperture 44 having a cross-section which is larger than, and correspond to locations of, the apertures 14 in the primary substrate 12, for orthogonally aligning the optical fibers 30 or other elements in the primary substrate 12.
4. Mounting alignment pins (not shown) in the primary substrate 12, and then mounting annular alignment substrate 42 above the primary substrate 12 by a predetermined distance "D" with the apertures 44 therein aligned with the aperture 14 in the primary substrate 12.
5. Aligning the layer 20 to the alignment pins in the primary substrate 12, placing the layer 20 in contact with the primary substrate 12, and holding the foil 20 in place by any suitable means such as by a sandwich structure (not shown), clamps (not shown), or by means of a bonding material (not shown).
6. Locating a first major surface of a vacuum substrate 46 adjacent the exposed surface 25 of the layer 20. The vacuum substrate 46 has first and second major surfaces defining apertures 48 therethrough which are larger than, and correspond to locations of the apertures 24 in the layer 20. Vacuum is then applied to the second major surface 25 and its apertures 24.
7. Threading the optical fibers or other elements through the apertures 44, 14, 24, and 48 in the annular alignment substrate 42, the primary substrate 12, the layer 20, and the vacuum substrate 46, respectively, aided by the negative pressure of the vacuum.
8. Registering (aligning) the optical fibers 30 to the apertures 24 of the layer 20 to the desired tolerance.
9. Bonding the optical fibers 30 or other elements to the primary substrate 12 and the aperture 14 therein.
10. Removing the vacuum substrate 46, and then either removing the layer 20 by etching or other means, or leaving the layer 20 in place.
11. Cleaving the optical fibers 30, and then grinding and polishing flat the exposed ends of the optical fibers 30 to a surface 25 of the layer 20 (when left in place) or to surface 19 of the primary substrate 12 (when the layer 20 is removed).

Figure 11A:
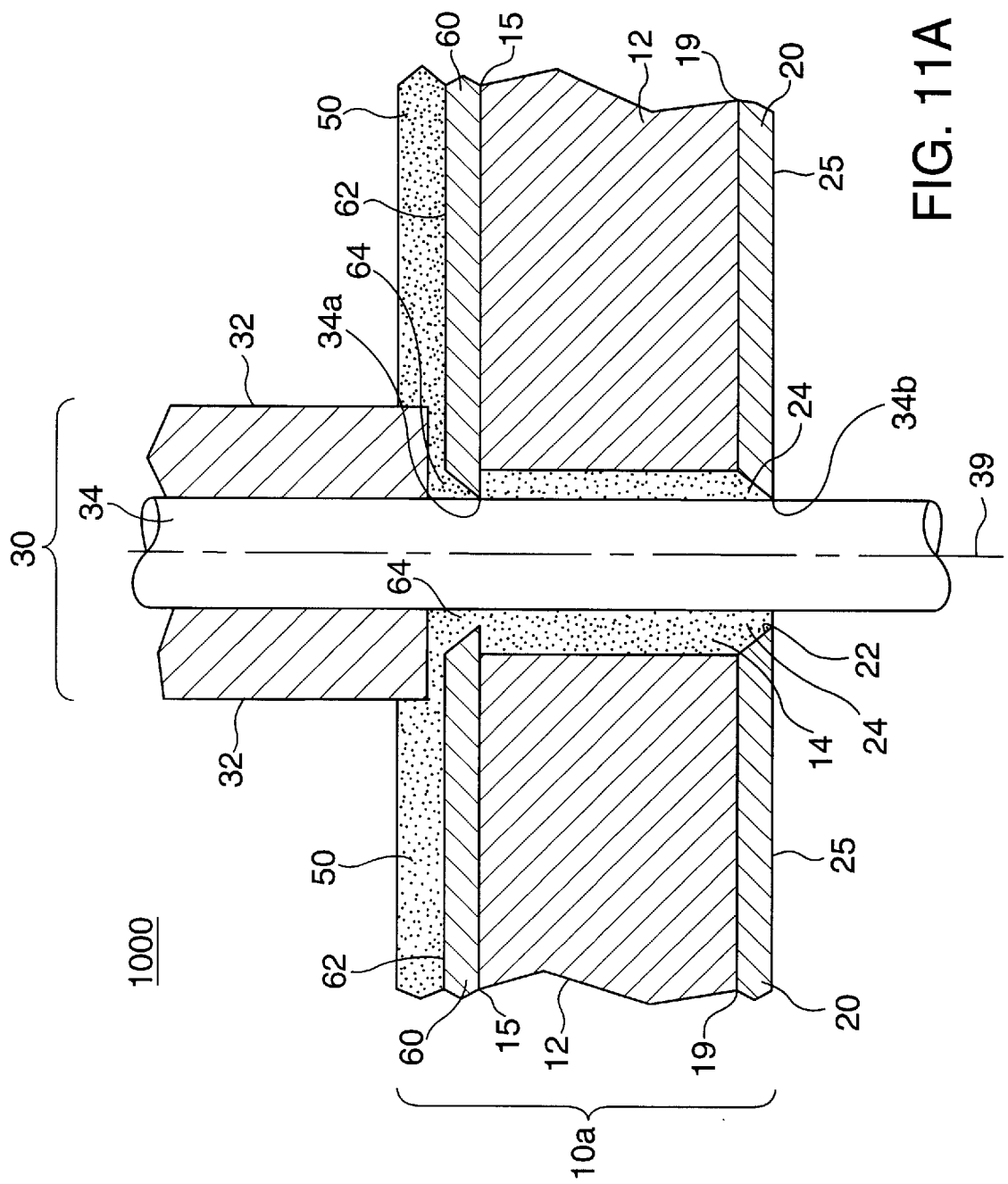
FIGS. 11A and 11B show a cross-sectional side view of optical fiber array apparatus in accordance with the present invention.
Figure 11B:
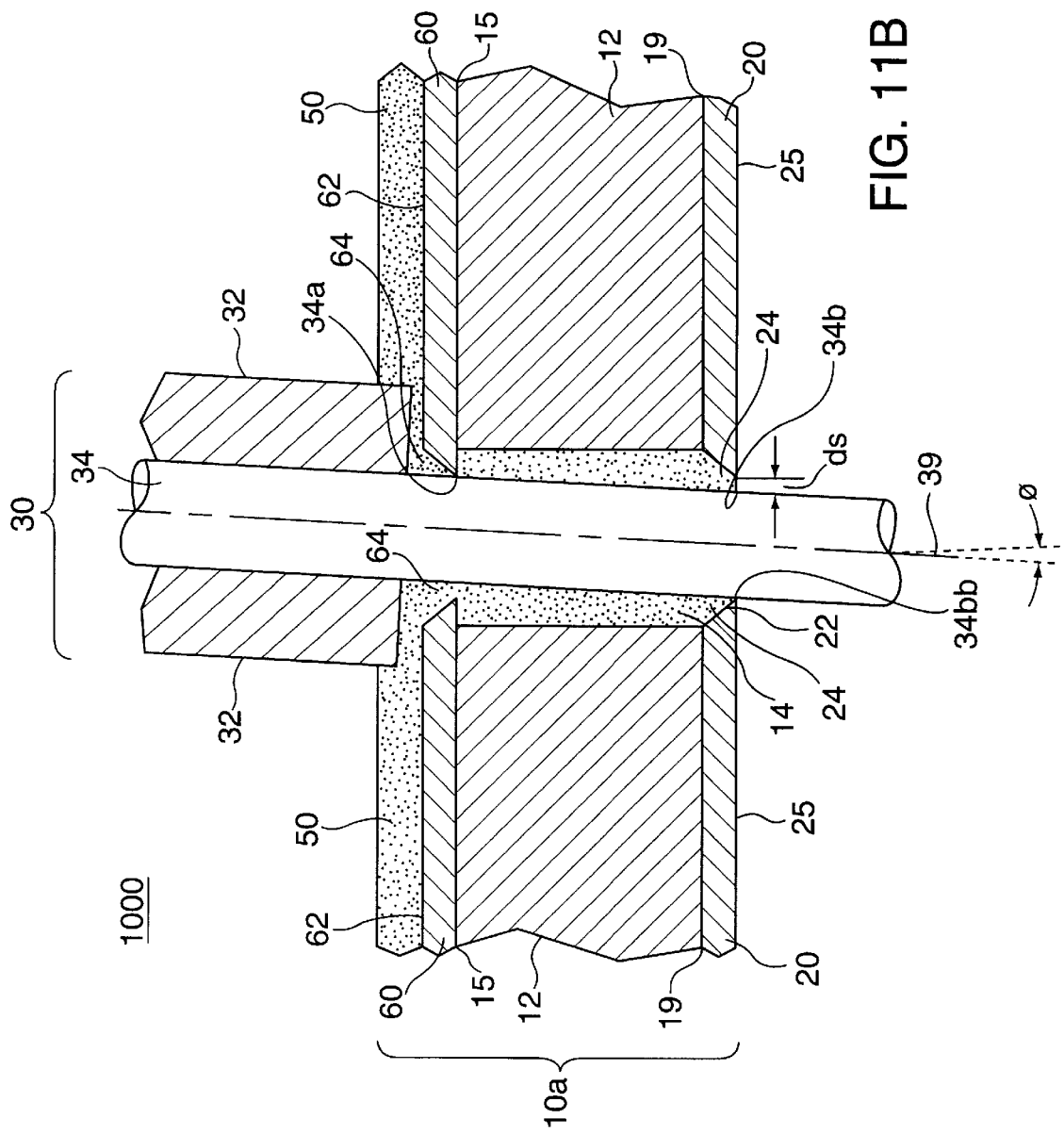

Referring now to FIGS. 11A and 11B, there are shown cross-sectional side views of a portion of optical fiber array apparatus 1000 in accordance with the present invention. Apparatus 1000 of FIGS. 11A and 11B is similar to apparatus 100 of FIG. 3 and all components thereof which are similar or essentially identical have the same reference number. Apparatus 1000 comprises a substrate array 10a which holds an array of optical fibers 30 (only one of which is shown) that are aligned with respect to each other to a preselected tolerance value and are all essentially perpendicular (FIG. 11A) to a top surface 62 of a second relatively thin layer 60 of the substrate array 10a. FIG. 11B shows the optical fiber 30 somewhat angularly displaced by an angle θ from being perpendicular to the surface 62 of the thin layer 60 of substrate array 10a to illustrate the maximum possible angular error θ when it is passed through apertures 64, 14, and 24 in the substrate array 10a. The angle θ is essentially the amount of angular displacement from a major longitudinal axis of an optical fiber 30. The angles θ and θ' shown in subsequent figures subsequent thereto also denotes the amount of angular displacement from a major longitudinal axis of an optical fiber 30. When θ and θ'=0 degrees the cladding layer 34 of an optical fiber 30 is essentially perpendicular to a major horizontal axis of the substrate array 10a.

The substrate array 10a comprises a relatively thick primary substrate 12, a first relatively thin layer 20, and the second relatively thin layer 60. Layers 20 and 60 can be identical and both can be an electroformed metal. The primary substrate 12 comprises first and second opposing surfaces 15 and 19, respectively, and defines a plurality of N primary substrate apertures 14 (of which only one is shown) which each extend therethrough from the first surface 15 to the second surface 19. A cross section of each of the apertures 14 is greater than a cross-section of a cladding layer 34 of an optical fiber 30. The primary substrate 12 is formed from a material having sufficient structure and geometry to support an array of a plurality of N optical fibers 30 that are each mounted through a separate one of the plurality of N primary substrate apertures 14.

The first layer 20 is mounted on the second surface 19 of the primary substrate 12 and defines a plurality of N first layer apertures 24 therethrough which are aligned to a tolerance which is desired for an array of optical fibers 30. Each of the plurality of N first layer apertures 24 are smaller than the cross-section of each of the primary substrate apertures 14, are larger than the cross-section of each of the cladding layers 34 of the optical fibers 30, and lie within a footprint of a corresponding one of the primary substrate apertures 14. Still further, each of the plurality of N first layer apertures 24 can comprise any suitable shape as, for example, circular or diamond shaped.

The second layer 60 is mounted on the first surface 15 of the primary substrate 12 and defines a plurality of N second layer apertures 64 therethrough which are in one embodiment equal to a preselected tolerance value which is desired for an array of optical fibers 30. Each of the plurality of N second layer apertures 64 are smaller than the cross-section of each of the primary substrate apertures 14, are larger than the cross-section of each of the cladding layers 34 of the optical fibers 30, and lie within a footprint of a corresponding one of the primary substrate apertures 14. In one variation of this embodiment the apertures 24 and 64 are of the same size and vertically aligned one over the other such that the right hand side of each aperture 64 is directly over a right hand side of an aperture 24. As will be clear from the below description, this ensures that an optical fiber 30 passing through apertures 64, 14, and 24 is essentially perpendicular to a top surface 62 of layer 60 to within a small angular variation. When the optical fibers 30 are inserted through second layer apertures 64, the primary substrate apertures 14, and through the first layer apertures 24, the optical fibers 30 are aligned to a preselected alignment tolerance value and also to a preselected angular tolerance for the array of optical fibers 30.

The size of each of the apertures 24 is within a preselected alignment tolerance value of the substrate array 10a as was discussed hereinbefore in association with FIGS. 4–10. For example, if a diameter of a circular aperture 24, or each side of a diamond shaped aperture 24, has a dimension of 128 micrometers and the diameter of the cladding 34 of the optical fiber is 126 micrometers, then the optical fibers 30 are aligned center-to-center with a predetermined tolerance value. In one embodiment the size of the apertures 64 in the second layer 60 are shown as equal to the size of the apertures 24 in the first layer 20 in this embodiment and the centers of the apertures 64 and 24 are aligned.

As will become clear from subsequently described embodiments, the size of apertures 64 can be greater than that of apertures 24 and can be horizontally displaced from the apertures 24. If the sizes of the apertures 64 are 24 are both equal to 128 micrometers, are aligned one directly above the other (their centers are aligned), and there is a distance P (the thickness of the primary substrate 12) of 60 mils there between, then inserting a 126 micrometer diameter optical fiber 30 therethrough produces an angular error from perpendicular of no more than about 0.075 degrees. As is shown in FIG. 11B, if an upper portion 34a of the cladding layer 34 engages a lower right side of the aperture 64 in the second layer 60 and a lower portion 34bb of the cladding layer 34 engages an opposing lower left side of the aperture 24 in the first layer 20, the optical fiber 30 is tilted at a maximum predetermined angle θ. The angle θ can be calculated from the equation $\theta = \tan^{-1} ds/P$, where ds is the distance from a lower left portion 34b of the cladding layer 34 (which is opposite a lower left portion 34bb of the cladding layer 34 that contacts a lower left edge of an aperture 24), and a right hand lower edge portion of aperture 24.

In one application using this embodiment it is desired that the angle θ be as close to zero as is reasonably possible (i.e., the central axis of the optical fiber 30 is perpendicular to the surface 62 or is close to being perpendicular thereto). To achieve this result, the cladding layer 34 of each of the optical fibers 30 is each placed through one set of the apertures 64, 14, and 24 and then it is moved such that the upper portion 34a and the lower portion 34b contact the right hand lower sides of the apertures 64 and 24, as is shown in FIG. 11A. FIG. 11B shows the maximum possible error in degrees θ that can occur in the angular alignment of an optical fiber 30 when the apertures 64 and 24 are equal, the centers are aligned, and the upper portion 34a of the cladding layer 34 contacts a right side lower edge of an aperture 64 in layer 60 and the lower portion 34b of the cladding layer 34 contacts a left side lower edge of aperture 24. With apertures 64 (of layer 60) and 24 (of layer 20) being diamond shaped and the cladding layer 34 of the optical fiber 30 being located against the right hand two sides of apertures 64 and 24, the angular error can be diminished to very small amounts because the optical fiber 30 is referenced (aligned) to known accurate locations. Once the plurality of N optical fibers 30 are mounted through the plurality of N apertures 64 of layer 60, apertures 14 of primary substrate 12, and apertures 24 of layer 20 and are aligned within the predetermined alignment tolerance value and angular tolerance value, the optical fibers are bonded in place using an adhesive layer 50 as described hereinbefore for FIGS. 7–10.

It is possible in FIG. 11A that the centers of the apertures 64 and 24 are aligned but that the size of aperture 64 is greater than that of aperture 24. For example, aperture 64 can be 148 micrometers and aperture 24 can be 128 micrometers. With a cladding layer 34 of an optical fiber 30 having a cladding layer with a diameter of 126 micrometers inserted anywhere through apertures 64, 14, and 24, the angular alignment with a P distance of 60 mils is within about 0.5 degrees of being perpendicular to the surface 62.

Figure 12:
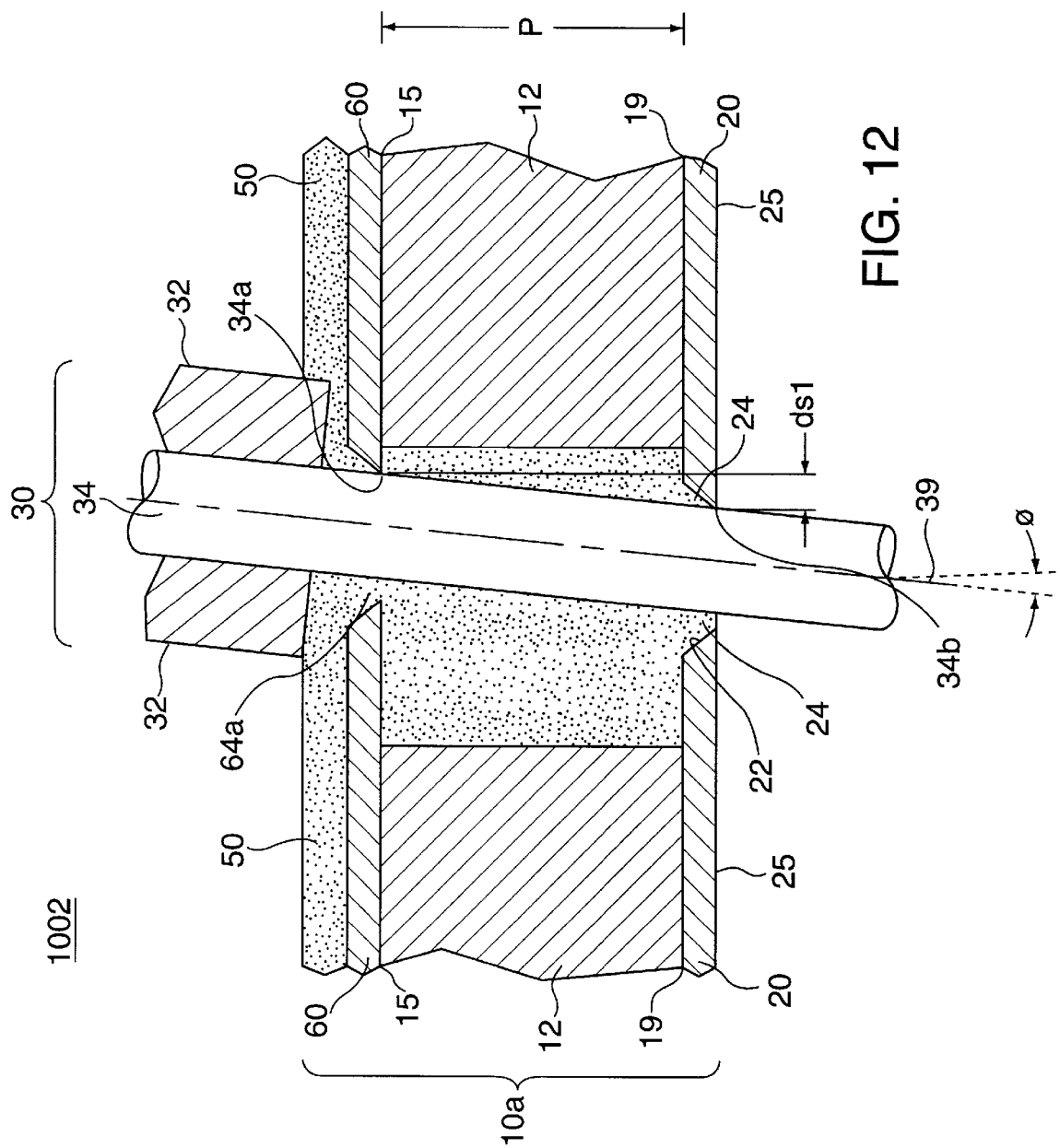
FIG. 12 shows a cross-sectional side view of optical fiber array apparatus in accordance with the present invention.
Figure 13A:
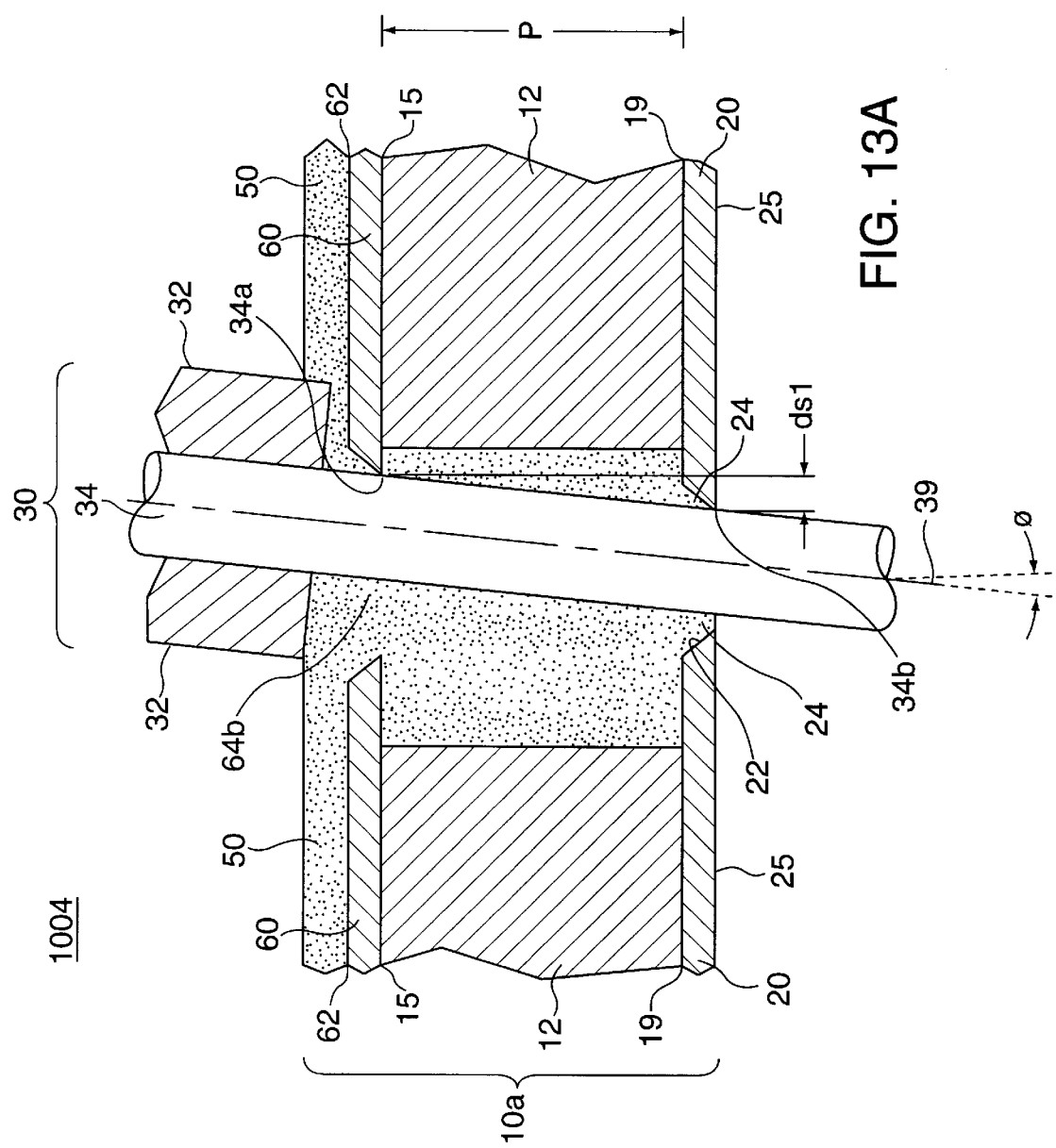
FIGS. 13A and 13B show a cross-sectional side view of optical fiber array apparatus in accordance with the present invention.
Figure 13B:
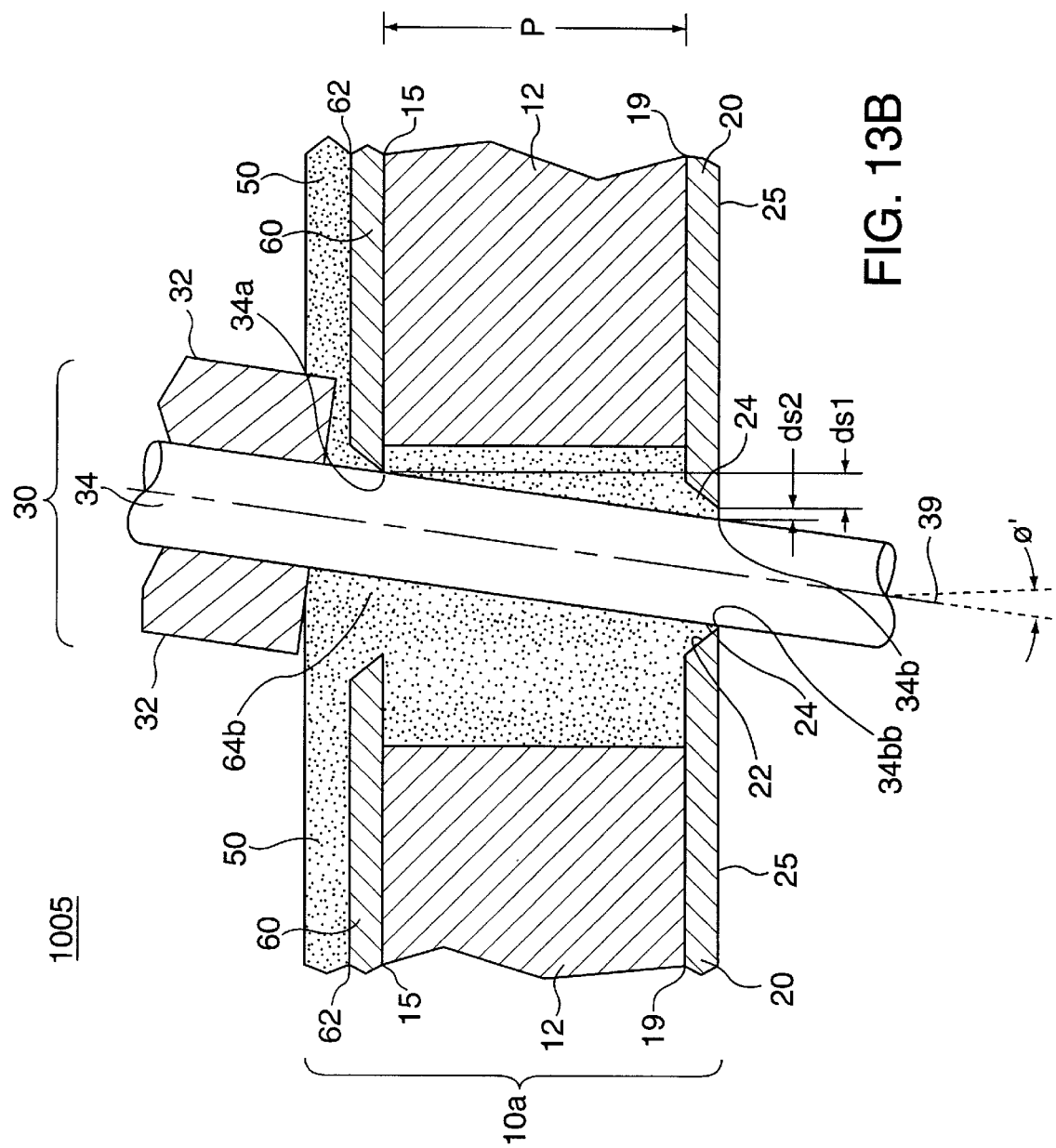

Referring now to FIGS. 12, 13A, and 13B, there are shown embodiments of the present invention where a substrate array 10a is arranged to mount elements such as optical fibers 30 at a predetermined angle θ (e.g., 8 degrees) from normal. Portions of a substrate array 10a which are similar or identical to those of substrate array 10a of FIGS. 11A and 11B have the same reference number, and an optical fiber 30 is the optical fiber of FIG. 2. For the case where the elements are optical fibers 30 which are mounted orthogonal (normal) to a bottom surface 25 of the substrate array 10a (as shown in FIGS. 11A and 11B), it has been observed that light propagating in the core 36 (shown in FIG. 2) of the optical fiber 30 can be reflected back into the core 36 when encountering the polished end of the optical fiber 30. To avoid such reflected light from interfering with the signal being propagated through the core 36 of the optical fiber 30, it is desirable to register or align the optical fibers 30 at a predetermined angle θ (e.g., 8 degrees) from normal in the substrate array 10a (i.e., at an angle θ from a primary central axis of the optical fiber 30) as is shown in FIGS. 12, 13A, and 13B. More particularly, for an optical fiber 30, an angle θ of 8 degrees from normal to the substrate array 10a is desirable since after polishing a front face of the optical fiber 30 parallel to a major surface 19 of the primary substrate 12 (e.g., as shown in FIGS. 9, 10, 11A and 11B), the optical return loss at the angled glass-to-air interface is significantly reduced from that where the optical fiber 30 is aligned orthogonal to the bottom surface 25 of the primary substrate 12.

Referring now to FIG. 12, there is shown a cross-sectional side view of a portion of optical fiber array apparatus 1002 in accordance with the present invention. Apparatus 1002 is very similar to apparatus 1000 of FIGS. 11A and 11B and all components thereof which are essentially the same have the same reference numbers. Essentially the only difference between apparatus 1002 and apparatus 1000 is that apertures 64a of layer 60 of apparatus 1002, in addition to be vertically separated from apertures 24 of layer 20, are horizontally displaced to the right by an amount (distance) ds1 from apertures 24 of layer 20 as compared to apertures 64 of layer 60 of apparatus 1000 which are located directly vertically above apertures 24 of layer 20. This results in an upper portion 34a of the cladding layer 34 contacting a right hand lower portion of aperture 64a of layer 60 and a lower portion 34b of the cladding layer 34 contacting a right hand lower side of aperture 24 of layer 20 with the contact points being horizontally displaced by a horizontal distance ds1. The horizontal displacement of apertures 64a relative to apertures 24 by the amount ds1 facilitates aligning optical fibers 30 at a predetermined angle θ (e.g., 8 degrees) from normal in accordance with the present invention.

Apparatus 1002 comprises a substrate array 10a which holds an array of optical fibers 30 (only one of which is shown) that are aligned with respect to each other to a preselected tolerance value. The substrate array 10a comprises a relatively thick primary substrate 12, a first relatively thin layer 20, and a second relatively thin layer 60 which each define a plurality of N apertures 14, 24, and 64a, respectively, similar to that described hereinabove for FIG. 11. More particularly, each of the apertures 24 and 64a in the first and second layers 20 and 60, respectively, are smaller than the aperture 14 in the primary substrate 12, lie within the footprint of the aperture 14, and have the same dimensioned openings that are offset from each other by a distance "ds1". The apertures 24 and 64a in the first and second layers 20 and 60, respectively, can comprise any suitable shape such as, for example, circular or diamond shaped. For example, if a diameter of a circular aperture 24 or each side of a diamond shaped aperture 24 had a dimension of 128 micrometers and the diameter of the cladding 34 of the optical fiber were 126 micrometers, the primary substrate has a predetermined thickness "P", and the offset between the first and second layers 20 and 60 is a predetermined "ds1" value, then the optical fiber would be aligned at a predetermined angle θ (e.g., 8 degrees). The angle θ can be calculated from the equation $\theta = \tan^{-1} ds1/P$, and a desired angle θ can be obtained by varying the offset dS1. The optical fibers 30 of the optical fiber array 10a would be within the predetermined alignment tolerance when each of the optical fibers 30 are similarly aligned within their respective apertures 24 and 64a.

Referring now to FIGS. 13A and 13B, there are shown cross-sectional side views of a portion of optical fiber array apparatus 1004 in accordance with the present invention. Apparatus 1004 is very similar to apparatus 1002 of FIG. 12 and all components thereof which are essentially the same have the same reference numbers. Essentially the only difference between apparatus 1004 and apparatus 1002 is that apertures 64b of layer 60 of apparatus 1004 are larger than apertures 64a of apparatus 1002 of FIG. 12. The right hand edge of each aperture 64b is horizontally displaced by a distance ds1 from the right hand edge of each aperture 24. This horizontal displacement ds1 of the right hand edges of apertures 64b relative to the right hand edges of apertures 24 facilitates aligning optical fibers 30 at a predetermined angle θ (e.g., 8 degrees) from normal (a vertical orientation) in accordance with the present invention. The size of apertures 64b being greater than apertures 64a of FIG. 12 makes it easier to insert an optical fiber 30 into apertures 64b of layer 60 of apparatus 1002 than into apertures 64 of layer 60 of apparatus 1000 of FIGS. 11A and 11B.

FIG. 13A shows the preferred alignment of the cladding layer 34 of optical fiber 30 with an upper portion 34a touching a right hand side lower portion of the aperture 64b and a lower portion 34b touching a right end lower portion of the aperture 24. This results in the optical fiber 30 being at an angle θ.

FIG. 13B shows the optical fiber 30 angularly displaced by an angle θ' from being perpendicular to the surface 62 of the thin layer 60 of substrate array 10a to illustrate the maximum possible angular error when it is passed through apertures 64, 14, and 24 in the substrate array 10a. Angle θ' is greater than angle θ of FIGS. 12 and 13B. This can occur if upper right hand side portion 34a of the cladding layer 34 touches the lower right hand side of the aperture 64b and the lower left hand portion 34bb of the cladding layer 34 touches the lower left hand side of aperture 24 as is shown in FIG. 13B. The angular error $\theta' = \tan^{-1}(ds1+ds2)$.

It is noted that with aperture 64b having a greater size than aperture 24 that the centers of apertures 64b and 24 of apparatus 1004 of FIGS. 13A and 13B could be aligned while still leaving the lower right hand edge of aperture 64b horizontally separated from the lower right hand edge of aperture 24 by a distance ds1.

In each of FIGS. 11A, 12, and 13A, once the plurality of N optical fibers 30 are mounted through the plurality of N apertures 64 (64a, 64b), 14, and 24 in the substrate array 10a, they are positioned against the right hand sides of the apertures 64, 64a, and 64b, respectively, and are bonded in place using an adhesive layer 50 as described hereinbefore for FIGS. 7–10. The optical fibers 30 are then cleaved parallel with the bottom surface 19 of the primary substrate 12 and then ground and polished. Once polished, each end of the optical fibers 30 in the substrate array 10a is at an angle θ (e.g., 0 degrees for apparatus 1000 of FIG. 11A and 8 degrees for apparatuses 1002 and 1004 of FIGS. 12, and 13A, respectively) to the longitudinal axis of the optical fiber 30.

It is to be appreciated and understood that the specific embodiments of the present invention described hereinabove are merely illustrative of the general principles of the present invention. Various modifications may be made by those skilled in the art which are consistent with the principles set forth. For example, the apertures 24 in the layer 20 can have any suitable shape that allows an optical fiber to be moved to contact at least one point, and preferably two points, on the side surface of the aperture 24. Still further, the layer 20 can be placed on either major surface of the primary substrate 12 with correspondingly located apertures 24 that provide precision alignment via two point registration for elements such as optical fibers 30 or other suitable elements in an array. Still further, the steps of the assembly process described above can be performed in other sequences to produce the optical fiber substrate array 10 shown in FIGS. 9 and 10. Furthermore, the tapered sidewalls 16 of the primary substrate 12 and the tapered sidewalls 22 of layer 20 can be cylindrical. Still further, the optical fibers can have tapered ends so as to facilitate easier insertion through the various apertures of the optical fiber array apparatus with the tapered ends extending completely through the apertures in the primary substrate 12 and the layer 20 such that the cladding layer 32 of an optical fiber 30 extends completely through both apertures 14 and 24. Furthermore, the relatively thin first and second layers can be formed by other than electroforming. For example, thin metal layers can be formed using a hot rolling process wherein a metal layer is pulled through a pair of opposing rollers.

What is claimed is:

1. Optical fiber array apparatus comprising:

a relatively thick primary substrate having sufficient structure to support an array of N spaced-apart optical fibers and having first and second opposing surfaces and defining a plurality of N primary substrate apertures which each extend therethrough from the first surface to the second surface with a cross-section of each of the N substrate apertures being greater than a cross-section of an optical fiber such that one optical fiber can be passed through in each of the N primary substrate apertures, each optical fiber comprising a cladding layer surrounding an optical core; and a relatively thin first layer, which has insufficient structure by itself to support an array of N spaced-apart optical fibers, engaging the second surface of the primary substrate and defining N apertures therethrough with centers of the first layer apertures being aligned to a preselected tolerance value which is that required for the array of optical fibers, the smallest cross-section of each of the first layer apertures being less than the smallest cross-section of each primary substrate apertures, each first layer aperture being within a footprint of one of the primary substrate apertures such that optical fibers inserted through the primary substrate apertures enter the first layer apertures, and the cross-sections of the first layer apertures having limited variations that result in spacings between adjacent optical fibers placed in the primary substrate apertures and entering the first layer apertures being within the preselected tolerance value such that optical fibers are aligned within the preselected tolerance value.

2. The optical fiber array apparatus of claim 1 wherein the first layer apertures have a cross-section which is greater than the cross-section of the cladding layer and optical core of each of the optical fibers and the cladding layers and optical cores of the optical fibers extend completely through the apertures in the relatively thin first layer.

3. The optical fiber array apparatus of claim 1 further comprising bonding material which fixes the positions of the N optical fibers to the primary substrate.

4. The optical fiber array apparatus of claim 1 wherein the first layer apertures each have a cross-section which is less than the cross-section of the cladding layer and optical core of each of the optical fibers and the optical fibers have tapered ends which include the optical cores that pass through each first layer aperture.

5. The optical fiber array apparatus of claim 1 wherein the first layer apertures each have a cross-section which is greater than the cross-section of a cladding layer and optical core of an optical fiber such that an optical fiber which has a tapered end containing a cladding layer and an optical core can pass through a primary substrate aperture and a first layer aperture.

6. The optical fiber array apparatus of claim 4 further comprising bonding material which fixes the positions of the N optical fibers to the primary substrate.

7. The optical fiber array apparatus of claim 5 further comprising bonding material which fixes the positions the of N optical fibers to the primary substrate.

8. The optical fiber array apparatus of claim 1 wherein the first layer apertures each have a portion that has a cylindrical cross-section.

9. The optical fiber array apparatus of claim 1 wherein the first layer apertures each have a portion with a non-cylindrical cross-section.

10. The optical fiber array apparatus of claim 1 further comprising an angular alignment substrate comprising first and second opposing major surfaces which define N alignment apertures therethrough from the first surface to the second surface with a cross-section that is larger than the cross-section of one of the optical fibers to be passed therethrough, the apertures through the angular alignment substrate being substantially aligned with the plurality of N apertures in the primary substrate for positioning the N optical fibers at a predetermined angular alignment in the primary substrate apertures.

11. The optical fiber array apparatus of claim 10 wherein a bonding material is applied to the first major surface of the primary substrate and into the primary substrate apertures and the first layer apertures once the N optical fibers are positioned and aligned in the primary substrate to the preselected tolerance value required for the array.

12. The optical fiber array apparatus of claim 1 further comprising a vacuum substrate which is temporarily used for threading the N optical fibers into the primary substrate apertures and the first layer apertures, the vacuum substrate comprising first and second opposing major surfaces which define N spaced-apart vacuum substrate apertures therethrough which cover footprints of the primary substrate apertures and the first layer apertures, each vacuum substrate aperture having a cross-section which is larger than the cross-section of an associated one of the N optical fibers to be threaded therethrough and the corresponding first layer aperture, the first major surface of the vacuum substrate engaging an exposed surface of the first layer and has vacuum selectively applied along the second major surface thereof to aid in drawing the N optical fibers through the primary substrate apertures, the first layer apertures, and the vacuum substrate apertures.

13. The optical fiber array apparatus of claim 12 wherein a bonding material is applied to the first major surface of the primary substrate and drawn into the primary substrate apertures and the first layer apertures by the vacuum applied to the vacuum substrate once the N optical fibers are positioned and aligned in the primary substrate to the preselected tolerance value required for the array.

14. The optical fiber array apparatus of claim 13 wherein the vacuum substrate is displaceable in a direction orthogonal to the major surface of the first layer while applying a tension on each of the N optical fibers, and the vacuum substrate is also selectively displaceable in a direction parallel to the major surface of the layer for concurrently aligning and holding each of the N optical fibers in the associated first layer aperture while the bonding material cures.

15. The optical fiber array apparatus of claim 1 wherein once the N optical fibers are positioned through the primary substrate apertures and aligned in the first layer apertures within the preselected tolerance value required for the array and bonded in place, the N optical fibers are cleaved and exposed ends of the N optical fibers are ground and polished (a) to the second surface of the primary substrate when the layer is removed, and (b) to the exposed surface of the layer when the layer remains in engagement with the second surface of the primary substrate.

16. The optical fiber array apparatus of claim 15 wherein the relatively thin first layer of metal is one of a group consisting of stainless steel, nickel cobalt, carbon steel, aluminum, copper, and nickel.

17. The optical fiber array apparatus of claim 15 wherein the relatively thin first layer is an electroformed metal.

18. The optical fiber array apparatus of claim 1 wherein the primary substrate is one of the group consisting of Macor™, ceramic, plastic, and silicon.

19. The apparatus of claim 1 further comprising:
a relatively thin second layer engaging the first surface of the primary substrate and defining N apertures therethrough;
the second layer apertures each having an edge thereof which is within the footprint of a primary substrate aperture such that optical fibers inserted through the second layer apertures, the primary substrate apertures, and the first layer apertures are positioned at a preselected angle relative to a primary axis thereof.

20. The optical fiber array apparatus of claim 19 wherein the relatively thin second layer is a metal.

21. The apparatus of claim 19 wherein the preselected angle is essentially 0 degrees.

22. The apparatus of claim 19 wherein the preselected angle is an acute angle.

23. The apparatus of claim 1 further comprising:
a relatively thin second layer engaging the first surface of the primary substrate and defining N apertures therethrough;
the second layer apertures being essentially the same size as the first layer apertures and being separated from the first layer apertures by the primary substrate and with the centers thereof being aligned with the centers of the first layer apertures such that optical fibers inserted through the second layer apertures, the primary substrate apertures, and the first layer apertures are positioned essentially perpendicular to a primary axis of the primary substrate.

24. The optical fiber array apparatus of claim 23 wherein the relatively thin second layer is a metal.

25. The apparatus of claim 1 further comprising:
a relatively thin second layer engaging the first surface of the primary substrate and defining N apertures therethrough;
the second layer apertures being essentially the same size as the first layer apertures, being separated from the first layer apertures by the primary substrate, and having the centers thereof spaced from the centers of the first layer apertures such that optical fibers inserted through the second layer apertures, the primary substrate apertures, and the first layer apertures are positioned at a preselected acute angle relative to a primary axis thereof.

26. The optical fiber array apparatus of claim 25 wherein the relatively thin second layer is a metal.

27. The apparatus of claim 1 further comprising:
a relatively thin second layer engaging the first surface of the primary substrate and defining N apertures therethrough;
the second layer apertures being larger than the first layer apertures, being separated from the first layer apertures by the primary substrate, and each having an edge which is within a footprint of one of the primary substrate apertures and is spaced apart from one edge of one of the first layer apertures such that optical fibers inserted through the second layer apertures, the primary substrate apertures, and the first layer apertures are positioned at a preselected acute angle relative to a primary axis thereof.

28. The optical fiber array apparatus of claim 27 wherein the relatively thin second layer is a metal.

29. The apparatus of claim 1 further comprising:
a relatively thin second layer engaging the first surface of the primary substrate and defining N apertures therethrough;
the second layer apertures being larger than the first layer apertures, being separated from the first layer apertures by the primary substrate, and each having an edge which is within a footprint of one of the primary substrate apertures and is spaced apart from one edge of one of the first layer apertures such that optical fibers inserted through the second layer apertures, the primary substrate apertures, and the first layer apertures are positioned essentially perpendicular to a major axis of the primary substrate.

30. The optical fiber array apparatus of claim 29 wherein the relatively thin second layer is a metal.

31. Optical fiber array apparatus comprising:
a relatively thick primary substrate having sufficient structure to support an array of N spaced-apart optical fibers and having first and second opposing surfaces and defining a plurality of N primary substrate apertures which each extend therethrough from the first surface to the second surface with a cross-section of each of the N substrate apertures being greater than a cross-section of an optical fiber such that one optical fiber can be passed through in each of the N primary substrate apertures, each optical fiber comprising a cladding layer surrounding an optical core; and
a relatively thin first layer, which has insufficient structure by itself to support an array of N spaced-apart optical fibers, engaging the second surface of the primary substrate and defining N apertures therethrough with centers of the first layer apertures being aligned to a preselected tolerance value which is that required for the array of optical fibers, the smallest cross-section of each of the first layer apertures being less than the smallest cross-section of each primary substrate apertures and being greater than the cross-section of a cladding layer and an optical core, each first layer aperture being within a footprint of one of the primary substrate apertures such that the cladding layers and the surrounded optical cores inserted through the primary substrate apertures pass can pass through the first layer apertures, and the cross-sections of the first layer apertures having limited variations that result in spacings between the cladding layers of adjacent optical fibers passing through the primary substrate apertures and the first layer apertures being within the preselected tolerance value such that the optical fibers are aligned within the preselected tolerance value.

32. The optical fiber array apparatus of claim 31 wherein the relatively thin first layer is an electroformed metal.

33. The optical fiber array apparatus of claim 31 wherein the relatively thin first layer is a metal of a group consisting of stainless steel, nickel cobalt, carbon steel, aluminum, copper, and nickel.

34. The apparatus of claim 31 wherein the primary substrate is one of the group consisting of Macor™, ceramic, plastic, and silicon.

35. The apparatus of claim 31 further comprising:
a relatively thin second layer engaging the first surface of the primary substrate and defining N apertures therethrough;
the second layer apertures each having an edge thereof which is within the footprint of a primary substrate aperture such that optical fibers inserted through the second layer apertures, the primary substrate apertures, and the first layer apertures are positioned at a preselected angle relative to a primary axis thereof.

36. The apparatus of claim 35 wherein the preselected angle is essentially 0 degrees.

37. The apparatus of claim 35 wherein the preselected angle is an acute angle.

38. The optical fiber array apparatus of claim 35 wherein the relatively thin second layer is a metal.

39. The apparatus of claim 31 further comprising:
a relatively thin second layer engaging the first surface of the primary substrate and defining N apertures therethrough;
the second layer apertures being essentially the same size as the first layer apertures and being separated from the first layer apertures by the primary substrate and with the centers thereof being aligned with the centers of the first layer apertures such that optical fibers inserted through the second layer apertures, the primary substrate apertures, and the first layer apertures are positioned essentially perpendicular to a primary axis of the primary substrate.

40. The optical fiber array apparatus of claim 39 wherein the relatively thin first layer is a metal.

41. The apparatus of claim 31 further comprising:
a relatively thin second layer engaging the first surface of the primary substrate and defining N apertures therethrough;
the second layer apertures being essentially the same size as the first layer apertures, being separated from the first layer apertures by the primary substrate, and having the centers thereof spaced from the centers of the first layer apertures such that optical fibers inserted through the second layer apertures, the primary substrate apertures, and the first layer apertures are positioned at a preselected acute angle relative to a primary axis thereof.

42. The optical fiber array apparatus of claim 41 wherein the relatively thin second layer is a metal.

43. The apparatus of claim 31 further comprising:
a relatively thin second layer engaging the first surface of the primary substrate and defining N apertures therethrough;
the second layer apertures being larger than the first layer apertures, being separated from the first layer apertures by the primary substrate, and each having an edge which is within a footprint of one of the primary substrate apertures and is spaced apart from one edge of one of the first layer apertures such that optical fibers inserted through the second layer apertures, the primary substrate apertures, and the first layer apertures are positioned essentially perpendicular to a major axis of the primary substrate.

44. The optical fiber array apparatus of claim 43 wherein the relatively thin second layer is a metal.

45. The apparatus of claim 31 further comprising:
a relatively thin second layer engaging the first surface of the primary substrate and defining N apertures therethrough;
the second layer apertures being larger than the first layer apertures, being separated from the first layer apertures by the primary substrate, and each having an edge which is within a footprint of one of the primary substrate apertures and is spaced apart from one edge of one of the first layer apertures such that optical fibers inserted through the second layer apertures, the primary substrate apertures, and the first layer apertures are positioned at a preselected acute angle relative to a primary axis thereof.

46. The optical fiber array apparatus of claim 45 wherein the relatively thin second layer is a metal.

47. A method of forming an array apparatus, which supports N spaced-apart optical fibers to a preselected tolerance value, the method comprising the steps of:
(a) forming, in a relatively thick primary substrate having sufficient structure to support an array of N spaced-apart optical fibers, N substrate apertures which each extend therethrough from a first surface of the primary substrate to a second surface of the primary substrate with a cross-section of each of the N primary substrate apertures being greater than a cross-section of an optical fiber such that one optical fiber can be passed through each of the N primary substrate apertures;
(b) forming a relatively thin first layer defining N apertures therethrough with centers of the layer apertures being aligned to the preselected tolerance value which is that required for the array of optical fibers, the size of the cross-section of each of the layer apertures being less than the size of the cross-section of each primary substrate aperture;
(c) locating the relatively thin first layer on the second surface of the primary substrate with each first layer aperture being within a footprint of one of the primary substrate apertures such that optical fibers inserted through the primary substrate apertures make contact with the first layer apertures, and the cross-sections of the first layer apertures having limited variations that result in spacings between adjacent optical fibers placed in the primary substrate apertures and in contact with the first layer apertures such that the optical fibers are aligned within the preselected tolerance value;
(d) inserting each of the N optical fibers through a separate aperture in the primary substrate and through a separate aperture in the first layer which is within the footprint of the primary substrate aperture; and
(e) applying a bonding material to the plurality of N optical fibers in their associated apertures in the primary substrate so as to attach the N optical fibers to the primary substrate with the optical fibers being aligned to the preselected tolerance value.

48. The method of claim 47 wherein in step (d) performing the substeps of:
(d1) positioning an angular alignment substrate to be separated from the first surface of the primary substrate, the angular alignment substrate defining a plurality of N apertures where the center of each aperture is aligned with a corresponding aperture in the primary substrate and has a cross-section which is larger than the cross-section of each of the plurality of N optical fibers to be threaded therethrough;
(d2) applying a vacuum to an end of the apertures in the first layer adjacent an exposed surface thereof; and (d3) threading each of the plurality of N optical fibers through the apertures in each of the angular alignment substrate, the primary substrate, and the first layer aided by negative pressure in the apertures provided by the vacuum.

49. The method of claim 48 wherein prior to performing step (d2), locating an aligning and tension applying means in contact with an exposed major surface of the first layer, the aligning and tension applying means defining apertures therethrough whose centers are aligned with centers of the apertures in the layer, each aperture in the aligning and tension applying means having a cross-section which is larger than the cross-section of the separate one of the plurality of N optical fibers to be threaded therethrough.

50. The method of claim 48 wherein in performing step (e) the bonding material is applied on the first major surface of the primary substrate opposite the first layer and drawn into the apertures in the primary substrate and the first layer by the vacuum.

51. The method of claim 47 further comprising the steps of:
    (f) cleaving each of the plurality of N optical fibers parallel to the exposed surface of electroformed foil once the bonding material has cured; and
    (g) grinding and polishing the cleaved ends of the plurality of N optical fiber (a) to the second surface of the primary substrate when the first layer is removed, and (b) to the exposed surface of the first layer when the first layer remains in engagement with the second surface of the primary substrate.

52. The method of claim 47 wherein the relatively thin first layer is an electroformed layer of a metal.

53. The method of claim 47 wherein the relatively thin first layer comprises a metal of a group consisting of stainless steel, nickel cobalt, carbon steel, aluminum, copper, and nickel.

54. The method of 47 further comprising the steps of:
    (c1) forming a relatively thin second layer defining N apertures therethrough;
    (c2) locating the relatively thin second layer on the second surface of the primary substrate such that an edge of each aperture therethrough is within a footprint of one of the apertures in the primary substrate and is horizontally located a preselected distance from an edge of one of the apertures through the first layer; and
    (d1) inserting each of the optical fibers through a separate one of the apertures in the second layer in addition to a separate aperture in the primary substrate and through a separate aperture in the first layer.

55. The method of claim 54 wherein the relatively thin second layer is an electroformed layer of a metal.

56. A method of forming an optical fiber array apparatus, which comprises an array of N spaced-apart optical fibers aligned to a preselected tolerance value, the method comprising the steps of:
    (a) forming, in a relatively thick primary substrate having sufficient structure to support an array of N spaced-apart optical fibers, N substrate apertures which each extend therethrough from a first surface of the primary substrate to a second surface of the primary substrate with a cross-section of each of the N primary substrate apertures being greater than a cross-section of a cladding layer and optical layer of an optical fiber such that the cladding layer of an optical fiber can be passed through each of the N primary substrate apertures;
    (b) electroforming a relatively thin metal first layer defining N apertures therethrough with centers of the first layer apertures being aligned to the preselected tolerance value which is that required for the array of N spaced-apart optical fibers, the size of the cross-section of each of the first layer apertures being less than the size of the cross-section of each primary substrate aperture;
    (c) locating the relatively thin metal first layer on the second surface of the primary substrate with each first layer aperture being within a footprint of one of the primary substrate apertures such that optical fibers inserted through the primary substrate apertures make contact with the first layer apertures, and the cross-sections of the first layer apertures having limited variations that result in spacings between adjacent optical fibers placed in the primary substrate apertures and in contact with the first layer apertures such that the optical fibers are aligned within the preselected tolerance value;
    (d) inserting each of the N optical fibers through a separate aperture in the primary substrate and through a separate aperture in the first layer which is within the footprint of the primary substrate aperture; and
    (e) applying a bonding material to the plurality of N optical fibers in their associated apertures in the primary substrate so as to attach the N optical fibers to the primary substrate with the optical fibers being aligned to the preselected tolerance value.

57. The method of 56 further comprising the steps of:
    (c1) forming a relatively thin second layer defining N apertures therethrough;
    (c2) locating the relatively thin second layer on the first surface of the primary substrate such that an edge of each aperture therethrough is within a footprint of one of the apertures in the primary substrate and is horizontally located a preselected distance from an edge of one of the apertures through the first layer; and
    (d1) inserting each of the optical fibers through a separate one of the apertures in the second layer in addition to a separate aperture in the primary substrate and through a separate aperture in the first layer.

58. The method of claim 56 wherein the relatively thin second layer is an electroformed layer of a metal.

59. Array apparatus comprising:
    a relatively thick primary substrate having sufficient structure to support an array of N spaced-apart elements and having first and second opposing surfaces and defining a plurality of N primary substrate apertures which each extend therethrough from the first surface to the second surface with a cross-section of each of the N substrate apertures being greater than a cross-section of an element such that one element can be passed through in each of the N primary substrate apertures; and
    a relatively thin first layer, which has insufficient structure by itself to support an array of N spaced-apart elements, engaging the second surface of the primary substrate and defining N apertures therethrough with centers of the first layer apertures being aligned to a preselected tolerance value which is that required for the array of N elements, the smallest cross-section of each of the first layer apertures being less than the smallest cross-section of each primary substrate apertures, each first layer aperture being within a footprint of one of the primary substrate apertures such that elements inserted through the primary substrate apertures enter the first layer apertures, and the cross-sections of the first layer apertures having limited variations that result in spacings between adjacent elements placed in the primary substrate apertures and entering the first layer apertures being within the preselected tolerance value such that elements are aligned within the preselected tolerance value.

60. The apparatus of claim 59 further comprising:

a relatively thin second layer engaging the first surface of the primary substrate and defining N apertures therethrough;

the second layer apertures being larger than the first layer apertures and being separated from the first layer apertures by the primary substrate and with the centers thereof being aligned with the centers of the first layer apertures such that elements inserted through the second layer apertures, the primary substrate apertures, and the first layer apertures are positioned essentially perpendicular to a primary axis of the primary substrate.

61. Array apparatus comprising:

a relatively thick primary substrate having sufficient structure to support an array of N spaced-apart elements and having first and second opposing surfaces and defining a plurality of N primary substrate apertures which each extend therethrough from the first surface to the second surface with a cross-section of each of the N substrate apertures being greater than a cross-section of an element such that one element can be passed through in each of the N primary substrate apertures; and a relatively thin first layer, which has insufficient structure by itself to support an array of N spaced-apart elements, engaging the second surface of the primary substrate and defining N apertures therethrough with centers of the first layer apertures being aligned to a preselected tolerance value which is that required for the array of elements, the smallest cross-section of each of the first layer apertures being less than the smallest cross-section of each primary substrate apertures and being greater than the cross-section of the element, each first layer aperture being within a footprint of one of the primary substrate apertures such that elements inserted through the primary substrate apertures can pass through the first layer apertures, and the cross-sections of the first layer apertures having limited variations that result in spacings between the adjacent elements passing through the primary substrate apertures and the first layer apertures being within the preselected tolerance value such that the elements are aligned within the preselected tolerance value.

62. The apparatus of claim 61 further comprising:

a relatively thin second layer engaging the first surface of the primary substrate and defining N apertures therethrough;

the second layer apertures being essentially the same size as the first layer apertures and being separated from the first layer apertures by the primary substrate and with the centers thereof being aligned with the centers of the first layer apertures such that elements inserted through the second layer apertures, the primary substrate apertures, and the first layer apertures are positioned essentially perpendicular to a primary axis of the primary substrate.

63. A method of forming an array apparatus, which supports N spaced-apart elements to a preselected tolerance value, the method comprising the steps of:

(a) forming, in a relatively thick primary substrate having sufficient structure to support an array of N spaced-apart elements, N substrate apertures which each extend therethrough from a first surface of the primary substrate to a second surface of the primary substrate with a cross-section of each of the N primary substrate apertures being greater than a cross-section of an element such that one element can be passed through each of the N primary substrate apertures;

(b) forming a relatively thin first layer defining N apertures therethrough with centers of the layer apertures being aligned to the preselected tolerance value which is that required for the array of elements, the size of the cross-section of each of the layer apertures being less than the size of the cross-section of each primary substrate aperture;

(c) locating the relatively thin first layer on the second surface of the primary substrate with each first layer aperture being within a footprint of one of the primary substrate apertures such that elements inserted through the primary substrate apertures make contact with the first layer apertures, and the cross-sections of the first layer apertures having limited variations that result in spacings between adjacent elements placed in the primary substrate apertures and in contact with the first layer apertures such that the elements are aligned within the preselected tolerance value;

(d) inserting each of the N elements through a separate aperture in the primary substrate and through a separate aperture in the first layer which is within the footprint of the primary substrate aperture; and (e) applying a bonding material to the plurality of N elements in their associated apertures in the primary substrate so as to attach the N elements to the primary substrate with the elements being aligned to the preselected tolerance value.

64. The method of 63 further comprising the steps of:

(c1) forming a relatively thin second layer defining N apertures therethrough;

(c2) locating the relatively thin second layer on the first surface of the primary substrate such that an edge of each aperture therethrough is within a footprint of one of the apertures in the primary substrate and is horizontally located a preselected distance from an edge of one of the apertures through the first layer; and (d1) inserting each of the elements through a separate one of the apertures in the second layer in addition to a separate aperture in the primary substrate and through a separate aperture in the first layer.

65. A method of forming an array apparatus, which comprises an array of N spaced-apart elements aligned to a preselected tolerance value, the method comprising the steps of:

(a) forming, in a relatively thick primary substrate having sufficient structure to support an array of N spaced-apart elements, N substrate apertures which each extend therethrough from a first surface of the primary substrate to a second surface of the primary substrate with a cross-section of each of the N primary substrate apertures being greater than a cross-section of an element such that the element can be passed through each of the N primary substrate apertures;

(b) electroforming a relatively thin metal first layer defining N apertures therethrough with centers of the first layer apertures being aligned to the preselected tolerance value which is that required for the array of N spaced-apart elements, the size of the cross-section of each of the first layer apertures being less than the size of the cross-section of each primary substrate aperture;

(c) locating the relatively thin metal first layer on the second surface of the primary substrate with each first layer aperture being within a footprint of one of the primary substrate apertures such that elements inserted through the primary substrate apertures make contact with the first layer apertures, and the cross-sections of the first layer apertures having limited variations that result in spacings between adjacent elements placed in the primary substrate apertures and in contact with the first layer apertures such that the elements are aligned within the preselected tolerance value;

(d) inserting each of the N elements through a separate aperture in the primary substrate and through a separate aperture in the first layer which is within the footprint of the primary substrate aperture; and (e) applying a bonding material to the plurality of N elements in their associated apertures in the primary substrate so as to attach the N elements to the primary substrate with the elements being aligned to the preselected tolerance value.

66. The method of 65 further comprising the steps of:

(c1) forming a relatively thin second layer defining N apertures therethrough;

(c2) locating the relatively thin second layer on the first surface of the primary substrate such that an edge of each aperture therethrough is within a footprint of one of the apertures in the primary substrate and is horizontally located a preselected distance from an edge of one of the apertures through the first layer; and (d1) inserting each of the elements through a separate one of the apertures in the second layer in addition to a separate aperture in the primary substrate and through a separate aperture in the first layer.

* * * * *